US010055247B2

United States Patent
Cabrera et al.

(10) Patent No.: US 10,055,247 B2
(45) Date of Patent: Aug. 21, 2018

(54) METHOD AND SYSTEM FOR ENABLING SELF-MONITORING VIRTUAL ASSETS TO CORRELATE EXTERNAL EVENTS WITH CHARACTERISTIC PATTERNS ASSOCIATED WITH THE VIRTUAL ASSETS

(71) Applicant: Intuit Inc., Mountain View, CA (US)

(72) Inventors: Luis Felipe Cabrera, Bellevue, WA (US); M. Shannon Lietz, San Marcos, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 15/356,985

(22) Filed: Nov. 21, 2016

(65) Prior Publication Data

US 2017/0068563 A1 Mar. 9, 2017

Related U.S. Application Data

(63) Continuation of application No. 14/448,405, filed on Jul. 31, 2014, now Pat. No. 9,516,044, and a
(Continued)

(51) Int. Cl.
*G06F 11/00* (2006.01)
*G06F 12/14* (2006.01)
(Continued)

(52) U.S. Cl.
CPC .......... *G06F 9/45558* (2013.01); *G06F 21/50* (2013.01); *G06F 21/55* (2013.01);
(Continued)

(58) Field of Classification Search
CPC ....... G06F 21/50–21/53; G06F 21/55–21/554; G06F 21/57; G06F 21/577
See application file for complete search history.

(56) References Cited

U.S. PATENT DOCUMENTS 5,712,641 A 1/1998 Casabona et al.
5,731,991 A 3/1998 Kinra et al.
(Continued)

FOREIGN PATENT DOCUMENTS

CN 101374051 2/2009
EP 2 541 420 1/2013
(Continued)

OTHER PUBLICATIONS

Tupakula, et al.; "Security Techniques for Zero Day Attacks;" Proceedings of the 7th International Wireless Communications and Mobile Computing Conference; Jul. 4-8, 2011; IEEE.
(Continued)

*Primary Examiner* — Daniel B Potratz
(74) *Attorney, Agent, or Firm* — Hawley Troxell Ennis & Hawley LLP; Philip McKay

(57) ABSTRACT

External events are correlated with patterns of characteristics in virtual assets. Upon detection of a pattern in a different asset that matches a pattern corresponding to an event, that detection is treated as a trigger event, with resulting responsive action(s) and other process operations. Security threats are managed in a similar manner, with first security threats being added to a collection of security threats. When a virtual asset detects a change in operating characteristics, a request is provided for the collection of current security threats, and the collection of security threats is provided responsive to the request.

18 Claims, 6 Drawing Sheets

Related U.S. Application Data continuation of application No. 14/256,289, filed on Apr. 18, 2014.

(51) Int. Cl.
*G06F 12/16* (2006.01)
*G08B 23/00* (2006.01)
*G06F 9/455* (2018.01)
*H04L 29/06* (2006.01)
*G06F 21/55* (2013.01)
*G06F 21/50* (2013.01)
*H04L 12/24* (2006.01)

(52) U.S. Cl.
CPC ...... *H04L 41/0886* (2013.01); *H04L 41/5025* (2013.01); *H04L 41/5032* (2013.01); *H04L 63/14* (2013.01); *H04L 63/1425* (2013.01); *G06F 2009/45591* (2013.01); *G06F 2009/45595* (2013.01); *H04L 41/5096* (2013.01)

(56) References Cited

U.S. PATENT DOCUMENTS

| | | | |
|---|---|---|---|
| 6,085,224 A | 7/2000 | Wagner | |
| 6,178,452 B1 | 1/2001 | Miyamoto | |
| 6,202,066 B1 | 3/2001 | Barkley et al. | |
| 6,205,552 B1 | 3/2001 | Fudge | |
| 6,321,338 B1 | 11/2001 | Porras et al. | |
| 6,343,236 B1 | 1/2002 | Gibson et al. | |
| 6,549,932 B1 | 4/2003 | McNally et al. | |
| 6,651,183 B1 | 11/2003 | Gensler et al. | |
| 7,055,062 B2 | 5/2006 | Shah et al. | |
| 7,114,183 B1 | 9/2006 | Joiner | |
| 7,228,438 B2 | 6/2007 | Bushmitch et al. | |
| 7,296,261 B2 | 11/2007 | Witchel et al. | |
| 7,373,524 B2 | 5/2008 | Motsinger et al. | |
| 7,426,745 B2 | 9/2008 | McCarty | |
| 7,437,764 B1 | 10/2008 | Sobel et al. | |
| 7,506,371 B1 | 3/2009 | Ben-Natan | |
| 7,552,424 B1 | 6/2009 | Bischof et al. | |
| 7,574,746 B2 | 8/2009 | Hill et al. | |
| 7,577,722 B1 | 8/2009 | Khandekar et al. | |
| 7,596,625 B2 | 9/2009 | Manion et al. | |
| 7,600,153 B2 | 10/2009 | Cabrera et al. | |
| 7,640,458 B2 | 12/2009 | Rao et al. | |
| 7,761,923 B2 | 7/2010 | Khuti et al. | |
| 7,779,247 B2 | 8/2010 | Roegner | |
| 7,788,235 B1 | 8/2010 | Yeo | |
| 7,792,256 B1 | 9/2010 | Arledge et al. | |
| 7,831,570 B2 | 11/2010 | Sack et al. | |
| 7,925,527 B1 | 4/2011 | Flam | |
| 7,925,923 B1 | 4/2011 | Hyser et al. | |
| 7,934,229 B1 | 4/2011 | Vogel | |
| 7,944,355 B2 | 5/2011 | Kumar et al. | |
| 7,996,836 B1 | 8/2011 | McCorkendale et al. | |
| 8,001,422 B1 | 8/2011 | Sun et al. | |
| 8,095,962 B2 | 1/2012 | Condon | |
| 8,108,855 B2 | 1/2012 | Dias et al. | |
| 8,132,231 B2 | 3/2012 | Amies et al. | |
| 8,161,475 B2 | 4/2012 | Araujo, Jr. et al. | |
| 8,171,485 B2 | 5/2012 | Muller | |
| 8,171,554 B2 | 5/2012 | Elovici et al. | |
| 8,181,036 B1 | 5/2012 | Nachenberg | |
| 8,191,149 B2 * | 5/2012 | Yun ..................... | H04L 63/145 726/25 |
| 8,266,670 B1 | 9/2012 | Merkow et al. | |
| 8,281,399 B1 | 10/2012 | Chen et al. | |
| 8,312,516 B1 | 11/2012 | Malatesta | |
| 8,327,373 B2 | 12/2012 | Srinivasan | |
| 8,341,625 B2 | 12/2012 | Ferris et al. | |
| 8,347,281 B2 | 1/2013 | Arsenault et al. | |
| 8,392,496 B2 | 3/2013 | Linden et al. | |
| 8,438,643 B2 | 5/2013 | Wiemer et al. | |
| 8,510,821 B1 | 8/2013 | Brandwine et al. | |
| 8,555,388 B1 | 10/2013 | Wang et al. | |
| 8,561,126 B2 | 10/2013 | Ananthanarayanan et al. | |
| 8,561,127 B1 | 10/2013 | Agrawal et al. | |
| 8,572,733 B1 | 10/2013 | Rockwood | |
| 8,615,785 B2 | 12/2013 | Elrod et al. | |
| 8,621,618 B1 | 12/2013 | Ramsey et al. | |
| 8,639,923 B2 | 1/2014 | Lo et al. | |
| 8,656,482 B1 | 2/2014 | Tosa et al. | |
| 8,683,585 B1 | 3/2014 | Chen et al. | |
| 8,688,820 B1 | 4/2014 | Bhogi et al. | |
| 8,726,383 B2 | 5/2014 | Blackwell | |
| 8,776,050 B2 | 7/2014 | Plouffe et al. | |
| 8,799,431 B2 | 8/2014 | Pabari | |
| 8,813,225 B1 | 8/2014 | Fuller et al. | |
| 8,863,284 B1 | 10/2014 | Polyakov et al. | |
| 8,918,785 B1 | 12/2014 | Brandwine et al. | |
| 8,959,633 B1 * | 2/2015 | Dokey ................... | G06F 21/50 705/30 |
| 8,990,935 B1 | 3/2015 | Cutts | |
| 9,047,582 B2 | 6/2015 | Hutchinson et al. | |
| 9,049,105 B1 | 6/2015 | Feinstein et al. | |
| 9,112,841 B1 | 8/2015 | Brandwine et al. | |
| 9,215,153 B2 | 12/2015 | DeLuca et al. | |
| 9,245,117 B2 | 1/2016 | Weaver et al. | |
| 9,246,935 B2 | 1/2016 | Lietz et al. | |
| 9,270,690 B2 | 2/2016 | Kraitsman et al. | |
| 9,276,945 B2 | 3/2016 | Lietz et al. | |
| 9,298,927 B2 | 3/2016 | Lietz et al. | |
| 9,313,281 B1 | 4/2016 | Lietz et al. | |
| 9,319,415 B2 | 4/2016 | Lietz et al. | |
| 9,323,926 B2 | 4/2016 | Cabrera et al. | |
| 9,325,726 B2 | 4/2016 | Lietz et al. | |
| 9,330,263 B2 | 5/2016 | Cabrera et al. | |
| 9,374,389 B2 | 6/2016 | Bishop et al. | |
| 9,390,288 B2 | 7/2016 | Gryb et al. | |
| 9,418,236 B2 | 8/2016 | Cabrera et al. | |
| 9,459,987 B2 | 10/2016 | Weaver et al. | |
| 9,473,481 B2 | 10/2016 | Lietz et al. | |
| 9,501,345 B1 | 11/2016 | Lietz et al. | |
| 2002/0066034 A1 | 5/2002 | Schlossberg et al. | |
| 2002/0099992 A1 | 7/2002 | Distler et al. | |
| 2002/0116404 A1 | 8/2002 | Cha et al. | |
| 2002/0138416 A1 | 9/2002 | Lovejoy et al. | |
| 2002/0147803 A1 | 10/2002 | Dodd et al. | |
| 2002/0156904 A1 | 10/2002 | Gullotta et al. | |
| 2003/0037263 A1 | 2/2003 | Kamat et al. | |
| 2003/0046128 A1 | 3/2003 | Heinrich | |
| 2003/0051154 A1 | 3/2003 | Barton et al. | |
| 2003/0084327 A1 | 5/2003 | Lingafelt et al. | |
| 2003/0088791 A1 | 5/2003 | Porras et al. | |
| 2003/0110392 A1 | 6/2003 | Aucsmith et al. | |
| 2003/0188191 A1 | 10/2003 | Aaron et al. | |
| 2003/0195959 A1 | 10/2003 | Labadie et al. | |
| 2003/0233438 A1 | 12/2003 | Hutchinson et al. | |
| 2004/0006704 A1 | 1/2004 | Dahlstrom et al. | |
| 2004/0010571 A1 | 1/2004 | Hutchinson et al. | |
| 2004/0044891 A1 | 3/2004 | Hanzlik et al. | |
| 2004/0181775 A1 | 9/2004 | Anonsen et al. | |
| 2004/0237093 A1 | 11/2004 | Sluiman et al. | |
| 2004/0249973 A1 | 12/2004 | Alkhatib et al. | |
| 2004/0249974 A1 | 12/2004 | Alkhatib et al. | |
| 2005/0018618 A1 | 1/2005 | Mualem et al. | |
| 2005/0066309 A1 | 3/2005 | Creamer et al. | |
| 2005/0091304 A1 | 4/2005 | Trayler | |
| 2005/0108571 A1 | 5/2005 | Lu et al. | |
| 2005/0114836 A1 | 5/2005 | Fu | |
| 2005/0155013 A1 | 7/2005 | Carrigan | |
| 2005/0172162 A1 | 8/2005 | Takahashi et al. | |
| 2005/0182969 A1 | 8/2005 | Ginter et al. | |
| 2005/0183138 A1 | 8/2005 | Phillips et al. | |
| 2005/0188222 A1 | 8/2005 | Motsinger et al. | |
| 2005/0193231 A1 | 9/2005 | Scheuren | |
| 2005/0193269 A1 | 9/2005 | Haswell et al. | |
| 2005/0204151 A1 | 9/2005 | Fang et al. | |
| 2005/0278790 A1 | 12/2005 | Birk et al. | |
| 2006/0031407 A1 | 2/2006 | Dispensa et al. | |
| 2006/0037077 A1 | 2/2006 | Gadde et al. | |

(56) References Cited

U.S. PATENT DOCUMENTS

| | | |
|---|---|---|
| 2006/0064740 A1* | 3/2006 | Kelley .................. G06F 21/577 726/3 |
| 2006/0090206 A1 | 4/2006 | Ladner et al. |
| 2006/0101519 A1 | 5/2006 | Lasswell et al. |
| 2006/0101520 A1 | 5/2006 | Schumaker et al. |
| 2006/0117209 A1 | 6/2006 | Drouet et al. |
| 2006/0136720 A1 | 6/2006 | Armstrong et al. |
| 2006/0184838 A1 | 8/2006 | Singonahalli et al. |
| 2006/0195745 A1 | 8/2006 | Keromytis et al. |
| 2006/0203739 A1 | 9/2006 | Padmanabhan et al. |
| 2006/0248573 A1 | 11/2006 | Pannu et al. |
| 2006/0272018 A1 | 11/2006 | Fouant |
| 2006/0293940 A1 | 12/2006 | Tsyganskiy et al. |
| 2007/0006304 A1 | 1/2007 | Kramer et al. |
| 2007/0027999 A1 | 2/2007 | Allen et al. |
| 2007/0043860 A1 | 2/2007 | Pabari |
| 2007/0079168 A1 | 4/2007 | Sivakumar et al. |
| 2007/0094711 A1 | 4/2007 | Corley et al. |
| 2007/0101400 A1 | 5/2007 | Freeman et al. |
| 2007/0157311 A1 | 7/2007 | Meier et al. |
| 2007/0169204 A1 | 7/2007 | Janakiraman et al. |
| 2007/0180509 A1 | 8/2007 | Swartz et al. |
| 2007/0185875 A1 | 8/2007 | Chang et al. |
| 2007/0204346 A1 | 8/2007 | Meier |
| 2007/0250424 A1 | 10/2007 | Kothari |
| 2008/0016570 A1 | 1/2008 | Capalik |
| 2008/0025288 A1 | 1/2008 | Benner et al. |
| 2008/0044018 A1 | 2/2008 | Scrimsher et al. |
| 2008/0141332 A1 | 6/2008 | Treinen |
| 2008/0148398 A1 | 6/2008 | Mezack et al. |
| 2008/0177691 A1 | 7/2008 | Alperovitch et al. |
| 2008/0184079 A1 | 7/2008 | Merriman et al. |
| 2008/0244744 A1 | 10/2008 | Thomas et al. |
| 2008/0256639 A1 | 10/2008 | Onoda et al. |
| 2008/0262990 A1 | 10/2008 | Kapoor et al. |
| 2008/0263670 A1 | 10/2008 | Stavrica |
| 2008/0295076 A1 | 11/2008 | McKain et al. |
| 2008/0307525 A1 | 12/2008 | Nickle |
| 2009/0007100 A1 | 1/2009 | Field et al. |
| 2009/0007264 A1 | 1/2009 | Chatterjee et al. |
| 2009/0049553 A1 | 2/2009 | Vasudeva |
| 2009/0083695 A1 | 3/2009 | Mir et al. |
| 2009/0089682 A1 | 4/2009 | Baier et al. |
| 2009/0089860 A1 | 4/2009 | Forrester et al. |
| 2009/0106838 A1 | 4/2009 | Clark et al. |
| 2009/0172788 A1 | 7/2009 | Vedula et al. |
| 2009/0177717 A1 | 7/2009 | Meehan et al. |
| 2009/0199273 A1 | 8/2009 | Yalamanchi |
| 2009/0205039 A1 | 8/2009 | Ormazabal et al. |
| 2009/0228973 A1 | 9/2009 | Kumar et al. |
| 2009/0254970 A1 | 10/2009 | Agarwal et al. |
| 2009/0254990 A1 | 10/2009 | McGee |
| 2009/0288078 A1 | 11/2009 | Makonahalli et al. |
| 2009/0293056 A1 | 11/2009 | Ferris et al. |
| 2009/0300045 A1 | 12/2009 | Chaudhry et al. |
| 2009/0300423 A1 | 12/2009 | Ferris |
| 2009/0319527 A1 | 12/2009 | King et al. |
| 2010/0020700 A1 | 1/2010 | Kailash et al. |
| 2010/0030544 A1 | 2/2010 | Gopalan et al. |
| 2010/0030878 A1 | 2/2010 | Grabowski et al. |
| 2010/0042734 A1 | 2/2010 | Olafsson et al. |
| 2010/0057660 A1 | 3/2010 | Kato |
| 2010/0070964 A1 | 3/2010 | Blumfield et al. |
| 2010/0076987 A1 | 3/2010 | Schreiner |
| 2010/0077203 A1 | 3/2010 | Ogawa et al. |
| 2010/0122317 A1 | 5/2010 | Yadav |
| 2010/0175108 A1 | 7/2010 | Protas |
| 2010/0192220 A1 | 7/2010 | Heizmann et al. |
| 2010/0199351 A1 | 8/2010 | Protas |
| 2010/0212010 A1 | 8/2010 | Stringer et al. |
| 2010/0217850 A1 | 8/2010 | Ferris |
| 2010/0235828 A1 | 9/2010 | Nishimura et al. |
| 2010/0251363 A1 | 9/2010 | Todorovic |
| 2010/0257267 A1 | 10/2010 | Sohn et al. |
| 2010/0257580 A1 | 10/2010 | Zhao |
| 2010/0257599 A1 | 10/2010 | Gleichauf |
| 2010/0269121 A1 | 10/2010 | Montesissa et al. |
| 2010/0287530 A1 | 11/2010 | MacLean et al. |
| 2010/0306268 A1 | 12/2010 | Bhatti et al. |
| 2010/0306354 A1 | 12/2010 | DeHaan et al. |
| 2010/0306772 A1 | 12/2010 | Arnold et al. |
| 2010/0318481 A1 | 12/2010 | Feynman |
| 2011/0029957 A1 | 2/2011 | Shufer et al. |
| 2011/0034182 A1 | 2/2011 | Issa et al. |
| 2011/0040825 A1* | 2/2011 | Ramzan .................. G06F 21/55 709/203 |
| 2011/0047621 A1 | 2/2011 | Brando et al. |
| 2011/0055921 A1 | 3/2011 | Narayanaswamy et al. |
| 2011/0067097 A1 | 3/2011 | Park et al. |
| 2011/0101109 A1 | 5/2011 | Bona et al. |
| 2011/0107398 A1 | 5/2011 | Earl et al. |
| 2011/0138382 A1 | 6/2011 | Hauser et al. |
| 2011/0138469 A1 | 6/2011 | Ye et al. |
| 2011/0145657 A1 | 6/2011 | Bishop et al. |
| 2011/0154324 A1 | 6/2011 | Pagan et al. |
| 2011/0167494 A1 | 7/2011 | Bowen et al. |
| 2011/0197065 A1 | 8/2011 | Stauth et al. |
| 2011/0208677 A1 | 8/2011 | Zhou et al. |
| 2011/0208797 A1 | 8/2011 | Kim |
| 2011/0238855 A1 | 9/2011 | Korsunsky et al. |
| 2011/0258692 A1 | 10/2011 | Morrison et al. |
| 2011/0302415 A1 | 12/2011 | Ahmad et al. |
| 2012/0005750 A1 | 1/2012 | Satish |
| 2012/0011510 A1 | 1/2012 | Yamakabe |
| 2012/0039336 A1 | 2/2012 | Richmond et al. |
| 2012/0042362 A1 | 2/2012 | Vlasov et al. |
| 2012/0060207 A1 | 3/2012 | Mardikar et al. |
| 2012/0072985 A1 | 3/2012 | Davne et al. |
| 2012/0110672 A1 | 5/2012 | Judge et al. |
| 2012/0117654 A1 | 5/2012 | Yalakanti |
| 2012/0137367 A1 | 5/2012 | Dupont et al. |
| 2012/0144489 A1 | 6/2012 | Jarrett et al. |
| 2012/0151488 A1 | 6/2012 | Arcese et al. |
| 2012/0151553 A1 | 6/2012 | Burgess et al. |
| 2012/0167167 A1 | 6/2012 | Kruger et al. |
| 2012/0185390 A1 | 7/2012 | Palnitkar et al. |
| 2012/0185913 A1 | 7/2012 | Martinez et al. |
| 2012/0209947 A1 | 8/2012 | Glaser et al. |
| 2012/0210437 A1 | 8/2012 | Karande et al. |
| 2012/0233668 A1 | 9/2012 | Leafe et al. |
| 2012/0240193 A1 | 9/2012 | Littlefield et al. |
| 2012/0266167 A1 | 10/2012 | Spiers et al. |
| 2012/0291094 A9 | 11/2012 | Forrester et al. |
| 2012/0303776 A1 | 11/2012 | Ferris |
| 2012/0304300 A1 | 11/2012 | LaBumbard |
| 2012/0311016 A1 | 12/2012 | DeAnna et al. |
| 2012/0311157 A1 | 12/2012 | Erickson et al. |
| 2012/0311387 A1 | 12/2012 | Santhosh et al. |
| 2012/0324446 A1 | 12/2012 | Fries et al. |
| 2012/0324572 A1 | 12/2012 | Gordon et al. |
| 2012/0324576 A1 | 12/2012 | Clark et al. |
| 2013/0019242 A1 | 1/2013 | Chen et al. |
| 2013/0019314 A1 | 1/2013 | Ji et al. |
| 2013/0046667 A1 | 2/2013 | Hill et al. |
| 2013/0054792 A1 | 2/2013 | Sharaf |
| 2013/0055246 A1 | 2/2013 | Li et al. |
| 2013/0055398 A1 | 2/2013 | Li et al. |
| 2013/0067067 A1 | 3/2013 | Miri et al. |
| 2013/0091376 A1 | 4/2013 | Raspudic et al. |
| 2013/0097316 A1 | 4/2013 | Bender et al. |
| 2013/0097701 A1 | 4/2013 | Moyle et al. |
| 2013/0104237 A1 | 4/2013 | Riley et al. |
| 2013/0117567 A1 | 5/2013 | Chang et al. |
| 2013/0117809 A1 | 5/2013 | McDougal et al. |
| 2013/0117852 A1 | 5/2013 | Stute |
| 2013/0124712 A1 | 5/2013 | Parker |
| 2013/0125121 A1 | 5/2013 | White |
| 2013/0132854 A1 | 5/2013 | Raleigh et al. |
| 2013/0132950 A1 | 5/2013 | McLeod et al. |
| 2013/0133072 A1 | 5/2013 | Kraitsman et al. |
| 2013/0160072 A1 | 6/2013 | Reus et al. |
| 2013/0174259 A1 | 7/2013 | Pearcy et al. |
| 2013/0185795 A1 | 7/2013 | Winn et al. |
| 2013/0227695 A1 | 8/2013 | Shankar |

(56) References Cited

U.S. PATENT DOCUMENTS

| | | |
|---|---|---|
| 2013/0238786 A1 | 9/2013 | Khesin |
| 2013/0247133 A1 | 9/2013 | Price et al. |
| 2013/0247135 A1 | 9/2013 | Kundu et al. |
| 2013/0247206 A1 | 9/2013 | Hugard et al. |
| 2013/0247207 A1 | 9/2013 | Hugard et al. |
| 2013/0263209 A1 | 10/2013 | Panuganty |
| 2013/0263226 A1 | 10/2013 | Sudia |
| 2013/0276108 A1 | 10/2013 | Blackwell |
| 2013/0276152 A1 | 10/2013 | Hirsch et al. |
| 2013/0290694 A1 | 10/2013 | Civilini et al. |
| 2013/0291068 A1 | 10/2013 | Huang |
| 2013/0291087 A1 | 10/2013 | Kailash et al. |
| 2013/0304693 A1 | 11/2013 | Jaeger et al. |
| 2013/0305357 A1 | 11/2013 | Ayyagari et al. |
| 2013/0305369 A1 | 11/2013 | Karta et al. |
| 2013/0305371 A1 | 11/2013 | Figlin et al. |
| 2013/0318599 A1 | 11/2013 | Fadida et al. |
| 2013/0326580 A1 | 12/2013 | Barclay et al. |
| 2013/0333040 A1 | 12/2013 | Diehl et al. |
| 2013/0339514 A1 | 12/2013 | Crank et al. |
| 2013/0343207 A1 | 12/2013 | Cook et al. |
| 2013/0346596 A1 | 12/2013 | Balakrishnan et al. |
| 2013/0347131 A1 | 12/2013 | Mooring et al. |
| 2014/0013452 A1 | 1/2014 | Aissi et al. |
| 2014/0026122 A1 | 1/2014 | Markande et al. |
| 2014/0026179 A1 | 1/2014 | Devarajan et al. |
| 2014/0026231 A1 | 1/2014 | Barak et al. |
| 2014/0033200 A1 | 1/2014 | Tompkins |
| 2014/0040299 A1 | 2/2014 | Datla et al. |
| 2014/0047546 A1 | 2/2014 | Sidagni |
| 2014/0068784 A1 | 3/2014 | Merkow et al. |
| 2014/0074799 A1 | 3/2014 | Karampuri et al. |
| 2014/0082621 A1 | 3/2014 | Fitzgerald et al. |
| 2014/0082733 A1 | 3/2014 | Benefield |
| 2014/0089204 A1 | 3/2014 | Spies et al. |
| 2014/0096134 A1* | 4/2014 | Barak ............... G06F 9/45558 718/1 |
| 2014/0109192 A1 | 4/2014 | Pidault et al. |
| 2014/0115578 A1 | 4/2014 | Cooper et al. |
| 2014/0165130 A1 | 6/2014 | Zaitsev |
| 2014/0172806 A1 | 6/2014 | Wilding |
| 2014/0173738 A1 | 6/2014 | Condry et al. |
| 2014/0189090 A1* | 7/2014 | Mikkilineni ......... H04L 41/0886 709/223 |
| 2014/0189680 A1 | 7/2014 | Kripalani |
| 2014/0196104 A1 | 7/2014 | Chari et al. |
| 2014/0196115 A1 | 7/2014 | Pelykh |
| 2014/0201836 A1 | 7/2014 | Amsler |
| 2014/0214460 A1 | 7/2014 | Rahnama |
| 2014/0258446 A1 | 9/2014 | Bursell |
| 2014/0258715 A1 | 9/2014 | Rodniansky |
| 2014/0259169 A1 | 9/2014 | Harrison |
| 2014/0282840 A1 | 9/2014 | Guinan |
| 2014/0282889 A1 | 9/2014 | Ishaya et al. |
| 2014/0289854 A1 | 9/2014 | Mahvi |
| 2014/0317737 A1 | 10/2014 | Shin et al. |
| 2014/0344933 A1 | 11/2014 | Huh et al. |
| 2014/0359259 A1 | 12/2014 | Ali et al. |
| 2015/0032587 A1 | 1/2015 | Broom et al. |
| 2015/0033340 A1 | 1/2015 | Giokas |
| 2015/0052108 A1 | 2/2015 | Volk et al. |
| 2015/0052402 A1 | 2/2015 | Gurumurthy et al. |
| 2015/0052520 A1 | 2/2015 | Crowell et al. |
| 2015/0067865 A1 | 3/2015 | Seacat Deluca et al. |
| 2015/0082307 A1 | 3/2015 | Bell et al. |
| 2015/0095691 A1 | 4/2015 | Edwards |
| 2015/0106939 A1 | 4/2015 | Lietz et al. |
| 2015/0120928 A1 | 4/2015 | Gummaraju et al. |
| 2015/0128130 A1 | 5/2015 | Weaver et al. |
| 2015/0128246 A1 | 5/2015 | Feghali et al. |
| 2015/0128274 A1 | 5/2015 | Giokas |
| 2015/0150123 A1 | 5/2015 | Be'ery |
| 2015/0215327 A1 | 7/2015 | Cabrera et al. |
| 2015/0222653 A1 | 8/2015 | Cabrera et al. |
| 2015/0229661 A1 | 8/2015 | Balabine et al. |
| 2015/0242631 A1 | 8/2015 | Cabrera et al. |
| 2015/0269064 A1 | 9/2015 | Bishop et al. |
| 2015/0271195 A1 | 9/2015 | Lietz et al. |
| 2015/0278523 A1 | 10/2015 | Brinkley et al. |
| 2015/0304343 A1 | 10/2015 | Cabrera et al. |
| 2015/0319186 A1 | 11/2015 | Lietz et al. |
| 2015/0347773 A1 | 12/2015 | Bonney et al. |
| 2015/0371044 A1 | 12/2015 | Home et al. |
| 2015/0381641 A1 | 12/2015 | Cabrera et al. |
| 2015/0381651 A1 | 12/2015 | Lietz et al. |
| 2016/0034359 A1 | 2/2016 | Cabrera et al. |
| 2016/0036835 A1 | 2/2016 | Lietz et al. |
| 2016/0092535 A1 | 3/2016 | Kuchibhotla et al. |
| 2016/0098340 A1 | 4/2016 | Weaver et al. |
| 2016/0234167 A1 | 8/2016 | Engel et al. |
| 2016/0371178 A1 | 12/2016 | Bishop et al. |

FOREIGN PATENT DOCUMENTS

| | | |
|---|---|---|
| WO | WO 2002/091182 | 11/2002 |
| WO | WO 2009/079648 | 6/2009 |
| WO | WO 2012/023657 | 2/2012 |
| WO | WO 2012/135192 | 10/2012 |
| WO | WO 2013/067404 | 5/2013 |
| WO | WO 2013/123548 | 8/2013 |
| WO | WO 2015/102776 | 7/2015 |

OTHER PUBLICATIONS

Tupakula, et al.; "Intrusion Detection Techniques for Infrastructure as a Service Cloud;" 2011 IEEE Ninth International Conference on Dependable, Autonomic and Secure Computing; Dec. 12-14, 2011; IEEE.

Schwarzkopf et al., "Increasing Virtual Machine Security in Cloud Environments," *Journal of Cloud Computing: Advances, Systems and Applications*, Jul. 2012, pp. 1-12.

"VMware Backdoor I/O Port," 38 pages [online], Retrieved on Sep. 2, 2015 from the Internet: <URL: https://sites.google.com/site/chitchatvmback/backdoor>.

"What is the virtual machine backdoor?" 9 pages [online], Aug. 27, 2009, Retrieved on Feb. 22, 2016 from the Internet: <URL: https://communities.vmware.com/thread/228415?start=0& tstart=0>.

\* cited by examiner

METHOD AND SYSTEM FOR ENABLING SELF-MONITORING VIRTUAL ASSETS TO CORRELATE EXTERNAL EVENTS WITH CHARACTERISTIC PATTERNS ASSOCIATED WITH THE VIRTUAL ASSETS

This application is a continuation of Cabrera, et al., U.S. patent application Ser. No. 14/256,289, filed on Apr. 18, 2014, entitled "METHOD AND SYSTEM FOR PROVIDING SELF-MONITORING, SELF-REPORTING, AND SELF-REPAIRING VIRTUAL ASSETS IN A CLOUD COMPUTING ENVIRONMENT", which is herein incorporated by reference in its entirety as if it were fully set forth herein.

This application is a continuation of Lietz, et al., U.S. patent application Ser. No. 14/448,405, filed on Jul. 31, 2014, entitled "METHOD AND SYSTEM FOR CORRELATING SELF-REPORTING VIRTUAL ASSET DATA WITH EXTERNAL EVENTS TO GENERATE AN EXTERNAL EVENT IDENTIFICATION DATABASE", which is herein incorporated by reference in its entirety as if it were fully set forth herein.

BACKGROUND

As various forms of distributed computing, such as cloud computing, have come to dominate the computing landscape, security has become a bottleneck issue that currently prevents the complete migration of various capabilities and systems associated with sensitive data, such as financial data, to cloud-based infrastructures, and/or other distributive computing models. This is because many owners and operators of data centers that provide access to data and other resources are extremely hesitant to allow their data and resources to be accessed, processed, and/or otherwise used, by virtual assets in the cloud.

In a cloud computing environment, various virtual assets, such as, but not limited to, virtual machine instances, data stores, and services, are created, launched, or instantiated, in the cloud for use by an "owner" of the virtual asset, herein also referred to as a user of the virtual asset.

Herein the terms "owner" and "user" of a virtual asset include, but are not limited to, applications, systems, and sub-systems of software and/or hardware, as well as persons or entities associated with an account number, or other identity, through which the virtual asset is purchased, approved managed, used, and/or created.

One major security issue in a cloud computing environment is that vulnerabilities associated with virtual assets are not always known or understood at the time the virtual assets are created and deployed, e.g., instantiated, in a given computing environment and, once deployed, detecting and/or responding to newly identified vulnerabilities through "normal" communications channels associated with the virtual assets can be challenging, if not impossible.

In addition, in some cases, a malicious entity is able to take control of a virtual asset. In these cases, the malicious entity often takes over, or closes down, normal communications channels associated with the virtual asset. Consequently, in some cases, the malicious entity can mask the fact they have taken control of the virtual asset from other entities outside the virtual asset, such as entities deployed by the owner to monitor and enforce security policies. This leaves the malicious entity relatively free to manipulate the virtual asset under its control and access any data used by the virtual asset, with little concern of detection by the legitimate owner of the virtual asset. Even in cases where the legitimate owner of the virtual asset does become aware that the virtual asset has been compromised, if the malicious entity has shut down, or taken control of, the normal communications channels associated with the virtual asset, the malicious entity can thwart any traditional efforts by the legitimate owner to communicate with the virtual asset and/or repair the virtual asset.

The situation described above represents a significant issue that must be resolved before highly sensitive data, such as financial data, can be safely processed in a cloud computing environment.

What is needed is a method and system for providing a virtual asset that can independently and automatically detect one or more trigger events within the virtual asset, generate suspicious event reporting data from the virtual asset, and provide the reporting data to a monitoring system external to the virtual asset, all without relying on detection of the suspicious event by entities outside the virtual asset itself or the use of normal communications channels.

Further, when a computing system detects operational characteristics that exceed normal operational characteristics, the computing system may have to cease operations, e.g., providing services to users, until one or more human resources evaluate the anomalous operational characteristics detected by the computing system. However, some deviations from a normal operating characteristic might be at least partly explainable. Therefore, what is further needed is a method and system for correlating data or patterns of computing systems or virtual assets with external events to provide additional explanations for deviations in normal operating characteristics.

SUMMARY

In one embodiment, a method and system described herein uses the occurrence and detection of external events and characteristics of one or more virtual assets being exhibited during the external event to create and maintain an event library. When a virtual asset or computing system later detects a deviation of one or more operating characteristics, a comparison is made between the current operating characteristics of the virtual asset or computing system and the event library to determine whether the deviations may be the result of a recurrence of the external event.

In accordance with one embodiment, a method and system for enabling self-monitoring virtual assets to correlate external events with characteristic patterns associated with the virtual assets includes providing a virtual asset monitoring system. In one embodiment, one or more trigger events to be reported when detected in a virtual asset are defined and virtual asset self-monitoring logic representing instructions for detecting the one or more trigger events within a virtual asset is generated. In some instances, those trigger events manifest themselves as one or more deviations from normal operating characteristics, and one or more current operating characteristics of the virtual asset is formed into a pattern reflecting the deviations.

The method and system include receiving first patterns from one or more first virtual assets, according to one embodiment. The first patterns represent groups of first operational characteristics of the one or more first virtual assets. The method and system include populating a database or other event library with the first patterns and the identification of one or more of the external events to map the one or more of the external events to the first patterns, according to one embodiment.

The method and system further include later receiving second patterns from one or more second virtual assets, where the second patterns represent second operational characteristics of one or more other virtual assets, according to one embodiment. The method and system include comparing the second patterns to the first patterns, and if they are similar or match, a trigger event is thus determined thereby, and other process operations occur to notify other entities of the existence of the second pattern matching a first pattern corresponding to an external event.

In one embodiment, virtual asset self-reporting logic for generating trigger event reporting data indicating a detected trigger event in a virtual asset is generated. In one embodiment, virtual asset self-reporting communications channel creation logic for opening a self-reporting communications channel between a virtual asset and the virtual asset monitoring system is generated.

In one embodiment, a self-monitoring virtual asset is instantiated including the virtual asset self-monitoring logic, the virtual asset self-reporting logic, and the virtual asset self-reporting communications channel creation logic. In one embodiment, when the self-monitoring virtual asset detects a trigger event in the self-monitoring virtual asset using the virtual asset self-monitoring logic, the self-monitoring virtual asset uses the virtual asset self-reporting logic to generate trigger event reporting data indicating the detected trigger event. The self-monitoring virtual asset then uses the virtual asset self-reporting communications channel creation logic to open a self-reporting communications channel between the self-monitoring virtual asset and the virtual asset monitoring system.

In one embodiment, the self-monitoring virtual asset then uses the self-reporting communications channel to transfer the trigger event reporting data from the self-monitoring virtual asset to the virtual asset monitoring system.

In accordance with one embodiment, a method and system for enabling self-monitoring virtual assets to correlate external events with characteristic patterns associated with the virtual assets includes providing a virtual asset monitoring system.

In one embodiment, one or more trigger events to be reported when detected in a virtual asset are defined and virtual asset self-monitoring logic for detecting the one or more trigger events within a virtual asset is generated.

In one embodiment, virtual asset self-reporting logic for generating trigger event reporting data indicating a detected trigger event in a virtual asset and virtual asset self-reporting communications channel creation logic for opening a self-reporting communications channel between a virtual asset and the virtual asset monitoring system is generated.

In one embodiment, a self-monitoring virtual asset is instantiated including the virtual asset self-monitoring logic, the virtual asset self-reporting logic, and the virtual asset self-reporting communications channel creation logic. In one embodiment, when a trigger event, such as a second pattern matching a first pattern associated with the occurrence of an external event, is detected in the self-monitoring virtual asset using the virtual asset self-monitoring logic, the self-monitoring virtual asset uses the virtual asset self-reporting logic to generate trigger event reporting data indicating the detected trigger event.

In one embodiment, the self-monitoring virtual asset then uses the virtual asset self-reporting communications channel creation logic to open a self-reporting communications channel between the self-monitoring virtual asset and the virtual asset monitoring system. In one embodiment, the self-monitoring virtual asset then uses the self-reporting communications channel to transfer the trigger event reporting data from the self-monitoring virtual asset to the virtual asset monitoring system.

In one embodiment, the trigger event reporting data is analyzed and responsive action implementation data representing instructions for implementing one or more responsive actions to the trigger event is generated and/or selected. In one embodiment, the responsive action implementation data is transferred from the virtual asset monitoring system to the self-monitoring virtual asset where the self-monitoring virtual asset uses the responsive action implementation data to implement the one or more responsive actions to the trigger event indicated in the trigger event reporting data.

In accordance with one embodiment, a method and system for enabling self-monitoring virtual assets to correlate external events with characteristic patterns associated with the virtual assets includes receiving, with the computing environment, a first security threat against a first virtual asset, where the first security threat is detected by the first virtual asset and the first virtual asset is hosted by the computing environment, according to one embodiment. The first virtual asset may represent an allocation of hardware and software resources within the computing environment for management by a tenant, and the first virtual asset may provide one or more services to one or more users. The method and system include adding the first security threat to the collection of security threats, where the collection of security threats may be hosted by the computing environment, according to one embodiment. The method and system include receiving a request from a second virtual asset for a status of the collection of security threats, in response to detection of changes in network performance within the computing environment by the second virtual asset, and transmitting the status of the collection of security threats to the second virtual asset, according to one embodiment.

Figure 1:
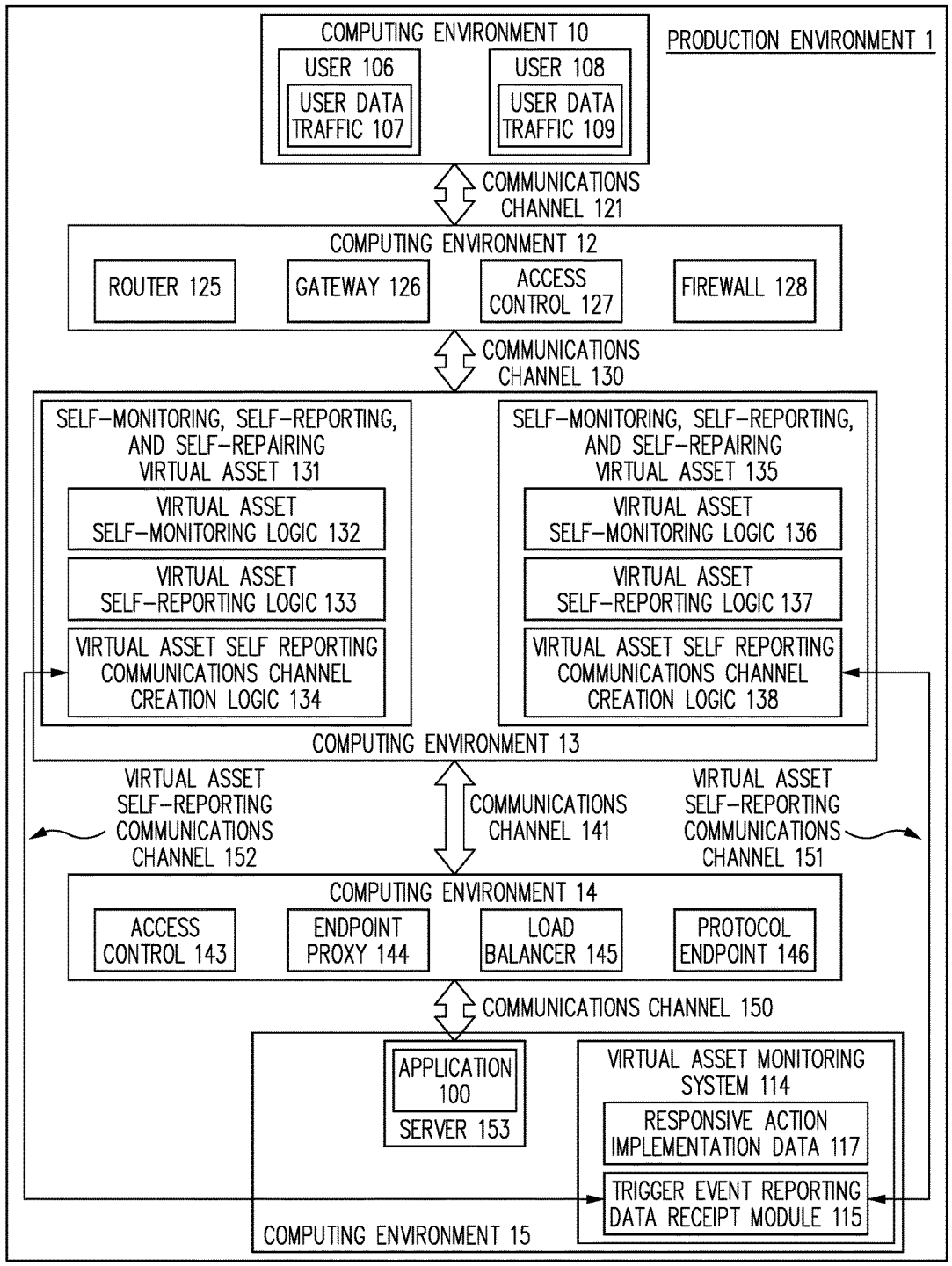
FIG. 1 is a functional block diagram showing the interaction of various components of a production environment for implementing one embodiment.

Common reference numerals are used throughout the figures and the detailed description to indicate like elements. One skilled in the art will readily recognize that the above figures are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

In accordance with one embodiment, a method and system for enabling self-monitoring virtual assets to correlate external events with characteristic patterns associated with the virtual assets includes a process for enabling self-monitoring virtual assets to correlate external events with characteristic patterns associated with the virtual assets implemented, at least in part, in a production environment.

Herein, the term "production environment" includes the various components, or assets, used to deploy, implement, access, and use, a given application as that application is intended to be used. In various embodiments, production environments include multiple assets that are combined; communicatively coupled; virtually and/or physically connected; and/or associated with one another, to provide the production environment implementing the application.

As specific illustrative examples, the assets making up a given production environment can include, but are not limited to, one or more computing environments used to implement the application in the production environment such as a data center, a cloud computing environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, used to implement the application in the production environment; one or more communications channels used to implement the application in the production environment; one or more access control systems, such as firewalls and gateways, used to implement the application in the production environment; one or more routing systems, such as routers and switches, used to implement the application in the production environment; one or more communications endpoint proxy systems, such as load balancers or buffers, used to implement the application in the production environment; one or more traffic or access control systems used to implement the application in the production environment; one or more secure communication protocols and/or endpoints, such as Secure Sockets Layer (SSL) protocols, used to implement the application in the production environment; one or more databases used to implement the application in the production environment; one or more internal or external services used to implement the application in the production environment; one or more backend systems, such as backend servers or other hardware used to implement the application in the production environment; one or more software systems used to implement the application in the production environment; and/or any other assets/components making up an actual production environment in which an application is deployed, implemented, accessed, and run, as discussed herein, and/or as known in the art at the time of filing, and/or as developed after the time of filing.

As used herein, the terms "computing system" and "computing entity", include, but are not limited to, a virtual asset; a server computing system; a workstation; a desktop computing system; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In accordance with one embodiment, a method and system for enabling self-monitoring virtual assets to correlate external events with characteristic patterns associated with the virtual assets includes a process for enabling self-monitoring virtual assets to correlate external events with characteristic patterns associated with the virtual assets implemented, at least in part, by one or more virtual assets in a cloud computing environment. In one embodiment, the cloud computing environment is part of, or is, the production environment of the application.

In one embodiment, the production environment includes one or more cloud computing environments. In various embodiments, the cloud computing environments can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service provided through the production environment may utilize, and interface with, multiple cloud computing environments, such as multiple VPCs, in the course of providing the associated service. In various embodiments, each cloud computing environment includes allocated assets and virtual assets associated with, and controlled or used by, the party utilizing the cloud computing environment.

As used herein, the term "virtual asset" includes any virtualized entity or resource, and/or part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment, the computing systems, and/or computing entities discussed herein, and/or as known in the art at the time of filing, and/or as developed after the time of filing, can be implemented as virtual assets.

Some virtual assets are substantially similar to, or identical to, other virtual assets in that the virtual assets have the same, or similar, operational parameters such as, but not limited to, the self-monitoring logic and capabilities as described herein; the self-reporting logic and capabilities as described herein; the self-repairing logic and capabilities as described herein; the same, or similar, function; the same, or similar, connectivity and communication features; the same, or similar, storage capability allocated to the virtual assets; the same, or similar, processing capability allocated to the virtual assets; the same, or similar, hardware, allocated to the virtual assets; the same, or similar, software allocated to virtual assets; and/or any combination of similar, or identical, operational parameters as discussed herein, and/or as known/available in the art at the time of filing, and/or as developed/made available after the time of filing.

Typically, virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system.

Other examples of virtual asset creation templates include, but are not limited to, any virtual appliance used to instantiate virtual assets. One specific illustrative example of such a virtual asset creation template is an Amazon Machine Image (AMI).

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

Herein virtual assets that have the same, or similar, operational parameters and are created by the same or similar virtual asset creation template are generically referred to as virtual assets of the same "class." Examples of virtual asset classes include, but are not limited to, virtual machine classes; virtual server classes; virtual database or data store classes; self-monitoring virtual assets including self-monitoring logic and capabilities as described herein; self-monitoring virtual assets including self-reporting logic and capabilities as described herein; self-repairing virtual assets including self-repairing logic and capabilities as described herein; specific types of instances instantiated in a cloud environment; application development process classes; and application classes.

In various embodiments, the one or more assets included in the production environment and/or implementing the processes for providing self-monitoring virtual assets are logically or physically located, and/or associated with, two or more computing environments. As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically trusted computing environments are those where the assets, infrastructure, communication and networking systems, and security systems associated with the computing systems and/or virtual assets making up the trusted computing environment, are either under the control of, or known to, a party. In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party.

Examples of trusted computing environments include the assets and components making up data centers associated with, and/or controlled by, an application and/or any computing systems and/or virtual assets, and/or networks of computing systems and/or virtual assets, associated with, known by, and/or controlled by, an application. Examples of untrusted computing environments include, but are not limited to, public networks, such as the Internet, various cloud-based computing environments, and various other forms of distributed computing systems.

It is often the case that an application needs to transfer data to, and/or from, a first computing environment that is an untrusted computing environment, such as, but not limited to, a public cloud, a virtual private cloud, and a trusted computing environment, such as, but not limited to, networks of computing systems in a data center controlled by, and/or associated with, the application. However, in other situations a party may wish to transfer data between two trusted computing environments, and/or two untrusted computing environments.

In one embodiment, two or more assets, such as computing systems and/or virtual assets, and/or two or more computing environments, in the production environment are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

FIG. 1 is a functional diagram of the interaction of various elements associated with exemplary embodiments of the methods and systems for enabling self-monitoring virtual assets to correlate external events with characteristic patterns associated with the virtual assets discussed herein. Of particular note, the various elements/assets in FIG. 1 are shown for illustrative purposes as being associated with production environment 1 and specific computing environments within production environment 1, such as computing environments 10, 12, 13, 14, and 15. However, the exemplary placement of the various elements/assets within these environments and systems in FIG. 1 is made for illustrative purposes only and, in various embodiments, any individual element/asset shown in FIG. 1, or combination of elements/assets shown in FIG. 1, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components, as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, the owner of a data center, a party and/or entity providing all or a portion of a cloud-based computing environment, the owner or a provider of an application or service, the owner or provider of one or more resources, and/or any other party and/or entity providing one or more functions, and/or any other party and/or entity as discussed herein, and/or as known in the art at the time of filing, and/or as made known after the time of filing.

Figure 2:
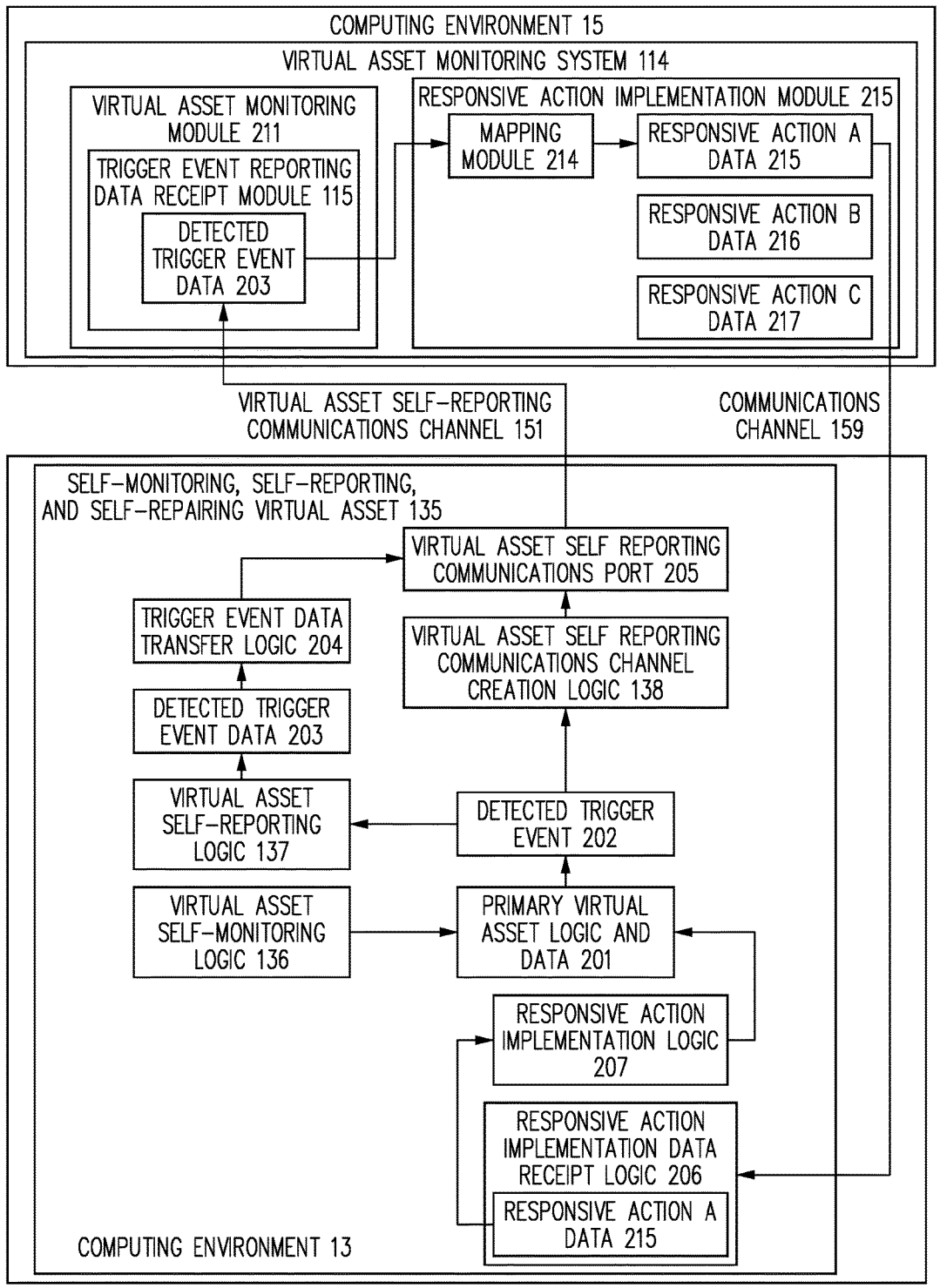
FIG. 2 is a more detailed functional block diagram showing the interaction of various components for implementing one embodiment.

FIG. 2 is a more detailed functional diagram of the interaction of various elements associated with one embodiment of the methods and systems for enabling self-monitoring virtual assets to correlate external events with characteristic patterns associated with the virtual assets discussed herein. Of particular note, the various elements in FIG. 2 are shown for illustrative purposes as being associated with specific computing environments, such as computing environment 15 and computing environment 13. However, the exemplary placement of the various elements within these environments and systems in FIG. 2 is made for illustrative purposes only and, in various embodiments, any individual element shown in FIG. 2, or combination of elements shown in FIG. 2, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components as discussed herein, and/or as known in the art at the time of filing, and/or as developed/made available after the time of filing.

In addition, the elements shown in FIG. 2, and/or the computing environments, systems and architectural and/or infrastructure components, deploying the elements shown in FIG. 2, can be under the control of, or otherwise associated with, various parties or entities, or multiple parties or entities, such as, but not limited to, the owner of a data center, a party and/or entity providing all or a portion of a cloud-based computing environment, the owner or a provider of a service, the owner or provider of one or more resources, and/or any other party and/or entity providing one or more functions, and/or any other party and/or entity as discussed herein, and/or as known in the art at the time of filing, and/or as made known after the time of filing.

In one embodiment, a production environment is provided for implementing an application. As noted above, FIG. 1 is a functional diagram of the interaction of various elements associated with one embodiment of a method and system for enabling self-monitoring virtual assets to correlate external events with characteristic patterns associated with the virtual assets discussed herein. In particular, FIG. 1 shows a given application, e.g., application 100 implemented in production environment 1 on server 153 and using various assets.

As seen in FIG. 1, in this specific illustrative example, application 100 is to be implemented using, and including, assets such as, but not limited to, computing environments 10, 12, 13, 14, and 15, used to implement application 100 in production environment 1, such as a data center, a cloud computing environment, and/or one or more other computing environments in which one or more assets and/or services used to implement application 100 in production environment 1 are deployed.

As seen in FIG. 1, production environment 1 includes computing environment 10, for instance a local area network, or the Internet, that includes users 106 and 108 generating user data traffic 107 and 109, respectively, using one or more computing systems (not shown). As seen in FIG. 1, user data traffic 107 and 109 is provided to computing environment 12, such as an access layer or Internet Service Provider (ISP) service used to access application 100, via communications channel 121.

As seen in FIG. 1, production environment 1 includes computing environment 12 which, in turn, includes, as illustrative examples, one or more assets such as router 125, gateway 126, access control 127, and firewall 128. As seen in FIG. 1, in this specific illustrative example, computing environment 12 is commutatively coupled to computing environment 13 of production environment 1 by communications channel 130.

In the specific illustrative example of FIG. 1, computing environment 13 of production environment 1 is a cloud computing environment and includes representative self-monitoring virtual assets 131 and 135 used to implement application 100. Self-monitoring virtual assets 131 and 135 are discussed in more detail below.

In the specific illustrative example of FIG. 1, production environment 1 includes computing environment 14, such as an access control layer, commutatively coupled to computing environment 13 by communications channel 141. In this specific illustrative example, computing environment 14 includes assets such as exemplary access control systems, e.g., one or more of access control 143, endpoint proxy 144, load balancer 145, and protocol endpoint 146.

As seen in the specific illustrative example of FIG. 1, production environment 1 includes computing environment 15, such as a data center or infrastructure provider environment, commutatively coupled to computing environment 14 by communications channel 150. In this specific illustrative example, computing environment 15 includes assets such server 153 associated with application 100 and virtual asset monitoring system 114. Virtual asset monitoring system 114 is discussed in more detail below.

In one embodiment, a cloud computing environment is provided. In various embodiments, the provided cloud computing environment can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In one embodiment, one or self-monitoring virtual assets are provided in a production environment.

As noted above, as used herein, the term "virtual asset", such as is used in the terms "self-monitoring virtual asset" and "self-reporting virtual asset" includes any virtualized entity or resource, and/or part of an actual, or "bare metal" entity.

As also noted above, in the specific illustrative example of FIG. 1, computing environment 13 is a cloud computing environment that is part of production environment 1 and includes representative self-monitoring virtual assets 131 and 135.

As discussed in more detail below, in one embodiment, self-monitoring virtual assets 131 and 135 include virtual asset self-monitoring logic 132 and 136, respectively. In one embodiment, virtual asset self-monitoring logic 132 and 136 include data and instructions for detecting one or more trigger events within self-monitoring virtual assets 131 and 135, respectively.

As discussed in more detail below, in one embodiment, self-monitoring virtual assets 131 and 135 include virtual asset self-reporting logic 133 and 137, respectively. In one embodiment, virtual asset self-reporting logic 133 and 137 includes data and instructions for generating trigger event reporting data if one of the one or more trigger events is detected in self-monitoring virtual assets 131 and 135 by virtual asset self-monitoring logic 132 and 136, respectively.

As discussed in more detail below, in one embodiment, self-monitoring virtual assets 131 and 135 include virtual asset self-reporting communications channel creation logic 134 and 138, respectively. In one embodiment, virtual asset self-reporting communications channel creation logic 134 and 138 includes data and instructions for opening a virtual asset self-reporting communications channel, such as virtual asset self-reporting communications channels 152 and 151, respectively, between self-monitoring virtual assets 131 and 135, respectively, and virtual asset monitoring system 114, if one of the one or more trigger events is detected in self-monitoring virtual assets 131 and 135 by the virtual asset self-monitoring logic 132 and 136, respectively.

As seen in FIG. 1 and as discussed in more detail below, virtual asset monitoring system 114 includes trigger event reporting data receipt module 115 for receiving trigger event reporting data from self-monitoring virtual assets 131 and 135 if one of the one or more trigger events is detected in self-monitoring virtual assets 131 and 135 by the virtual asset self-monitoring logic 132 and 136, respectively.

As also seen in FIG. 1, and as discussed in more detail below, virtual asset monitoring system 114 includes responsive action implementation data 117, which, in one embodiment, is provided to self-monitoring virtual assets 131 and 135 in response to the receipt of trigger event data from self-monitoring virtual assets 131 and 135.

In one embodiment, the virtual asset monitoring system is implemented in a first computing environment that is distinct from the computing environment in which the self-monitoring virtual assets are implemented, operated, and/or instantiated.

In one embodiment, the virtual asset monitoring system is implemented, at least in part, in a data center associated with the application being implemented and/or an owner of the self-monitoring virtual assets. In various embodiments, the virtual asset monitoring system is implemented in software, hardware, and/or a combination of software and hardware.

In one embodiment, the virtual asset monitoring system includes a virtual asset monitoring module and a response action implementation module. In one embodiment, the virtual asset monitoring module of the virtual asset monitoring system includes a trigger event reporting data receipt module which, as discussed below, is used to receive detected trigger event data from the self-monitoring virtual assets. In one embodiment, the responsive action implementation module of the virtual asset monitoring system includes the capability to analyze the detected trigger event data received from the self-monitoring virtual assets. In one embodiment, the analysis capability of the responsive action implementation module takes the form of a mapping module used to map specific detected trigger event data to specific responsive action data.

In a specific illustrative example, the responsive action implementation module receives the detected trigger event data from the trigger event reporting data receipt module and a mapping module is used to analyze the detected trigger event data and identify the detected trigger event. In this specific illustrative example, the mapping module then maps the detected trigger event to a specific responsive action represented and implemented by associated responsive action data.

As discussed in more detail below, in various embodiments, depending on the detected trigger event, the responsive actions represented by the responsive action data can include, but are not limited to, any one or more of, ignoring the detected trigger data; requesting the detected trigger data no longer be sent; performing a scan of selected data within the self-monitoring virtual asset; obtaining data from the self-monitoring virtual asset; directing a transfer of data from within the self-monitoring virtual asset to a location outside the self-monitoring virtual asset; closing down one or more communications channels used by the self-monitoring virtual asset; shutting down one or more capabilities of the self-monitoring virtual asset; aborting one or more operations performed by the self-monitoring virtual asset; destroying the self-monitoring virtual asset; generating and/or transferring incorrect and/or deceptive data from the self-reporting virtual asset to a location outside the self-monitoring virtual asset associated with a malicious entity; and/or any other desired responsive actions, or combination of responsive actions, as discussed herein, and/or as known in the art at the time of filing, and/or as developed/become available after the time of filing.

As noted above, FIG. 2 is a more detailed functional diagram of the interaction of various elements associated with one embodiment of the methods and systems for enabling self-monitoring virtual assets to correlate external events with characteristic patterns associated with the virtual assets discussed herein. Referring to FIG. 2, virtual asset monitoring system 114 is shown in this specific illustrative example as being implemented in computing environment 15.

As seen in FIG. 2, virtual asset monitoring system 114 includes virtual asset monitoring module 211 and responsive action implementation module 215. As also seen in FIG. 2, in this specific illustrative example, virtual asset monitoring module 211 includes trigger event reporting data receipt module 115; shown in this illustrative example as having received detected trigger event data 203 from self-monitoring virtual asset 135 via virtual asset self-reporting communication channel 151.

As also seen in FIG. 2, virtual asset monitoring system 114 includes responsive action implementation module 215 which includes mapping module 214 that maps received detected trigger event data 203 to one or more of responsive action A data 215, responsive action B data 216, and/or responsive action C data 217. As those of skill in the art will readily recognize, responsive action A data 215, responsive action B data 216, and responsive action C data 217 are representative of any number of responsive action data desired including fewer or more responsive action data.

In one embodiment, one or more trigger events are defined. In various embodiments, the one or more trigger events defined are events, states, or occurrences, that when detected in a virtual asset represent a potential security vulnerability, and/or a deviation from normal virtual asset operation.

In various embodiments, the one or more trigger events defined can include, but are not limited to, one or more of: a network message from a virtual asset directed to a location known to be associated with malicious entities, i.e., a black-listed destination; the frequency of outgoing network messages changing to a level above a defined threshold level, i.e., the frequency of outgoing network messages changing to a level deemed "not normal"; a response to a customer request being directed to a destination that is not the customer location of record; a virtual asset receiving a high-frequency of login attempts that fail; a size of the parameters sent into a virtual asset being outside a defined "normal" range of sizes for parameters; a size of outgoing network messages being outside a defined "normal" range of sizes of outgoing messages; a total amount of data in any one communication connection of a virtual asset exceeding a defined maximum normal size of a communication to a customer; a request to a virtual asset coming in from a location known to be associated with malicious entities, i.e., a black-listed origin location; an internal elapsed time of defined critical operations changing to a time outside a defined range of "normal" values; and/or any other trigger event, or combination of trigger events, as discussed herein, and/or as known in the art at the time of filing, and/or as developed/made available after the time of filing.

In one embodiment, once the trigger events are defined, virtual asset self-monitoring logic is generated for monitoring the primary operational logic and data of a virtual asset and detecting the one or more defined trigger events. In one embodiment, the virtual asset self-monitoring logic includes machine-readable code and instructions for monitoring the operational logic of the virtual asset and detecting the one or more defined trigger events within the virtual asset.

In one embodiment, virtual asset self-reporting logic is generated for generating trigger event reporting data indicating a detected trigger event if one of the one or more trigger events is detected in a virtual asset by the virtual asset self-monitoring logic. In one embodiment, the virtual asset self-reporting logic includes machine-readable code and instructions for creating detected trigger event data indicating a detected trigger event, and/or describing the detected trigger event, and/or generating log data representing the detected trigger event.

In one embodiment, virtual asset self-reporting communications channel creation logic is generated for opening a self-reporting communications channel between a virtual asset and the virtual asset monitoring system if one of the one or more trigger events is detected in a virtual asset by the virtual asset self-monitoring logic. In one embodiment, the virtual asset self-reporting communication channel creation logic includes machine-readable code and instructions for activating a self-reporting communications door, or port, pre-deployed, or implemented by, the virtual asset self-reporting communications channel creation logic in the virtual asset and thereby opening a self-reporting communications channel between the virtual asset and the virtual asset monitoring system.

In one embodiment, one or more self-monitoring virtual assets, and/or self-reporting virtual assets, are instantiated in a computing environment. In one embodiment, the one or more self-monitoring virtual assets, and/or self-reporting virtual assets, are instantiated in a second computing environment that is distinct from the first computing environment in which the virtual asset monitoring system is implemented. In one embodiment, the one or more self-monitoring virtual assets, and/or self-reporting virtual assets, are instantiated in a cloud computing environment that is distinct from a data center in which the virtual asset monitoring system is implemented.

As noted above, as used herein, the term "virtual asset", such as used in the terms "self-monitoring virtual asset" and "self-reporting virtual asset" includes any virtualized entity or resource, and/or part of an actual, or "bare metal" entity.

In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment, the computing systems, and/or computing entities discussed herein, and/or as known in the art at the time of filing, and/or as developed after the time of filing, can be implemented as virtual assets, and more particularly as, self-monitoring virtual assets, and/or self-reporting virtual assets.

As also noted above, some virtual assets are substantially similar to, or identical to, other virtual assets in that the virtual assets have the same, or similar, operational parameters such as, but not limited to, the self-monitoring logic and capabilities as described herein; the self-reporting logic and capabilities as described herein; the self-repairing logic and capabilities as described herein; the same, or similar, function; the same, or similar, connectivity and communication features; the same, or similar, storage capability allocated to the virtual assets; the same, or similar, processing capability allocated to the virtual assets; the same, or similar, hardware, allocated to the virtual assets; the same, or similar, software allocated to virtual assets; and/or any combination of similar, or identical, operational parameters as discussed herein, and/or as known/available in the art at the time of filing, and/or as developed/made available after the time of filing.

Typically, virtual assets, including self-monitoring virtual assets, and/or self-reporting virtual assets, are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system.

Other examples of virtual asset creation templates include, but are not limited to, any virtual appliance used to instantiate virtual assets. One specific illustrative example of such a virtual asset creation template is an Amazon Machine Image (AMI).

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

Herein, virtual assets that have the same, or similar, operational parameters and are created by the same or similar virtual asset creation template are generically referred to as virtual assets of the same "class." Examples of virtual asset classes include, but are not limited to, virtual machine classes; virtual server classes; virtual database or data store classes; self-monitoring virtual assets including self-monitoring logic and capabilities as described herein; self-reporting virtual assets including self-reporting logic and capabilities as described herein; self-repairing virtual assets including self-repairing logic and capabilities as described herein; specific types of instances instantiated in a cloud environment; application development process classes; and application classes.

In one embodiment, the virtual asset self-monitoring logic, the virtual asset self-reporting logic, and the virtual asset self-reporting communications channel creation logic, are provided to each of the one or more self-monitoring virtual assets, and/or self-reporting virtual assets, instantiated in the computing environment.

In one embodiment, the virtual asset self-monitoring logic, the virtual asset self-reporting logic, and the virtual asset self-reporting communications channel creation logic, are provided to each of the one or more self-monitoring virtual assets, and/or self-reporting virtual assets, instantiated in the computing environment using one or more self-reporting virtual asset creation templates.

Returning to FIG. 2, self-monitoring virtual asset 135 is shown as implemented, in this specific illustrative example, in computing environment 13 and includes virtual asset self-monitoring logic 136, virtual asset self-reporting logic 137, and virtual asset self-reporting communications channel creation logic 138. In this specific illustrative example, virtual asset self-monitoring logic 136, virtual asset self-reporting logic 137, and virtual asset self-reporting communications channel creation logic 138 are provided to self-monitoring virtual asset 135 using a self-reporting virtual asset creation template such as self-reporting virtual asset creation template 300 of FIG. 3 discussed below.

In one embodiment, once one or more self-monitoring virtual assets, and/or self-reporting virtual assets are instantiated and include the virtual asset self-monitoring logic, the virtual asset self-reporting logic, and the virtual asset self-reporting communications channel creation logic, the virtual asset self-monitoring logic is used to monitor and detect any of the defined trigger events within the self-monitoring virtual assets, and/or self-reporting virtual assets.

In one embodiment, the virtual asset self-monitoring logic is used to monitor and detect any of the defined trigger events within the self-monitoring virtual assets, and/or self-reporting virtual assets by monitoring primary virtual asset logic and data used by the self-monitoring virtual assets, and/or self-reporting virtual assets, in the course of their normal operations and the performance of their assigned functions.

In one embodiment, if one of the defined trigger events is detected within an affected one of the self-monitoring virtual assets, and/or self-reporting virtual assets, by the virtual asset self-monitoring logic, detected trigger event data associated with, describing, or representing log data associated with, the detected trigger event is generated by the virtual asset self-reporting logic provided to the affected self-monitoring, and/or self-reporting virtual asset.

In one embodiment, once a defined trigger event is detected within the self-monitoring, and/or self-reporting virtual asset, by the virtual asset self-monitoring logic, the virtual asset self-reporting communications channel creation logic provided to the self-monitoring virtual asset, and/or self-reporting virtual asset, is used to generate a self-reporting communications channel between the self-monitoring virtual asset, and/or self-reporting virtual asset, and the virtual asset monitoring system.

As noted above, in one embodiment, the virtual asset self-reporting communications channel creation logic generates a self-reporting communications channel by activating a self-reporting virtual asset self-reporting communications port pre-deployed, and/or implemented by, the virtual asset self-reporting communications channel creation logic. In one embodiment, the self-reporting communications channel generated by the virtual asset self-reporting communications channel creation logic is a communications channel distinct, and separate from, the various other "normal" communications channels utilized by the self-monitoring virtual assets, and/or self-reporting virtual assets, and/or other assets within the computing environment, and/or production environment, associated with the self-monitoring virtual assets, and/or self-reporting virtual assets.

Consequently, in one embodiment, the self-reporting communications channel generated by the virtual asset self-reporting communications channel creation logic is not subject to manipulation, and/or termination, by a malicious party that may have taken control of the self-monitoring virtual asset, and/or self-reporting virtual asset. In addition, the self-reporting communications channel generated by the virtual asset self-reporting communications channel creation logic is not dependent on security policy implementation systems or other entities outside of the self-monitoring virtual asset, and/or self-reporting virtual asset, other than the virtual asset monitoring system.

In one embodiment, once the self-reporting communications channel is generated by the virtual asset self-reporting communications channel creation logic, the detected trigger event data generated by the virtual asset self-reporting logic is transferred to trigger event data transfer logic which, in turn, facilitates the transfer of the detected trigger event data to the virtual asset self-reporting communications port generated by the virtual asset self-reporting communications channel creation logic.

In one embodiment, the detected trigger event data is then transferred from the self-monitoring virtual asset, and/or self-reporting virtual asset, to the virtual asset monitoring system using the virtual asset self-reporting communications channel generated by the virtual asset self-reporting communications channel creation logic.

In a specific illustrative example where the detected trigger event is detected in a self-monitoring virtual asset, once the detected trigger event data is transferred from the self-monitoring virtual asset to the virtual asset monitoring system, analysis is performed at the virtual asset monitoring system and appropriate investigative and/or protective action is taken in response to the detected trigger event.

However, in a specific illustrative example where the detected trigger event is detected in a self-reporting virtual asset, once the detected trigger event data is transferred from the self-reporting virtual asset to the virtual asset monitoring system, analysis is performed at the virtual asset monitoring system.

In one embodiment, the analysis performed at the virtual asset monitoring system includes mapping the detected trigger event data received to associated responsive action implementation data representing instructions for implementing one or more responsive actions to the trigger event indicated in the trigger event reporting data.

In one embodiment, once the detected trigger event data received is mapped to associated responsive action implementation data representing instructions for implementing one or more responsive actions to the trigger event indicated in the trigger event reporting data, the appropriate, or mapped, responsive action implementation data associated with the received trigger event data is provided to the self-reporting virtual asset.

In one embodiment, the appropriate, or mapped, responsive action implementation data associated with the received trigger event data is provided to the self-reporting virtual asset using the virtual asset self-reporting communication channel, and the virtual asset self-reporting communications port, generated by the virtual asset self-reporting communications channel creation logic provided to the self-reporting virtual asset.

In one embodiment, once the appropriate, or mapped, responsive action implementation data associated with the received trigger event data is provided to the self-reporting virtual asset, the appropriate, or mapped, responsive action implementation data is used by the self-reporting virtual asset to implement the responsive action associated with the responsive action implementation data.

As noted above, in various embodiments, the responsive actions associated with the responsive action implementation data can include, but are not limited to, any one or more of, requesting the detected trigger data no longer be sent; performing a scan of selected data within the self-reporting virtual asset; obtaining data from the self-reporting virtual asset; directing a transfer of data from within the self-reporting virtual asset to a location outside the self-reporting virtual asset; closing down one or more communications channels used by the self-reporting virtual asset; shutting down one or more capabilities of the self-reporting virtual asset; aborting one or more operations performed by the self-reporting virtual asset; destroying the self-reporting virtual asset; generating and/or transferring incorrect and/or deceptive data from the self-reporting virtual asset to a location outside the self-reporting virtual asset associated with a malicious entity; and/or any other desired responsive actions, or combination of responsive actions, as discussed herein, and/or as known in the art at the time of filing, and/or as developed/become available after the time of filing.

Returning to FIG. 2, as noted above, self-monitoring virtual asset 135 includes virtual asset self-monitoring logic 136 that is used by self-monitoring virtual asset 135 to monitor primary virtual asset logic and data 201 associated with the normal operations and functions of self-monitoring virtual asset 135 to detect a defined trigger event, such as detected trigger event 202.

In one embodiment, once detected trigger event 202 is detected by virtual asset self-monitoring logic 136, notice of detected trigger event 202 is provided to virtual asset self-reporting logic 137 and virtual asset self-reporting communications channel creation logic 138.

In one embodiment, once virtual asset self-reporting logic 137 receives notice of detected trigger event 202, virtual asset self-reporting logic 137 is used to generate detected trigger event data 203 representing a description, log data, or other data indicating detected trigger event 202.

In one embodiment, once virtual asset self-reporting communications channel creation logic 138 receives notice of detected trigger event 202, virtual asset self-reporting communications channel creation logic 138 activates virtual asset self-reporting communications port 205 and thereby creates virtual asset self-reporting communications channel 151.

In one embodiment, detected trigger event data 203 is provided to trigger event data transfer logic 204 which, in turn, facilitates the transfer of detected trigger event data 203 to virtual asset monitoring system 114 via virtual asset self-reporting communications port 205 and virtual asset self-reporting communications channel 151.

In one embodiment, detected trigger event data 203 is received at trigger event reporting data receipt module 115 of virtual asset monitoring module 211 of virtual asset monitoring system 114.

As noted above, in one embodiment, where self-monitoring virtual asset 135 is used as a self-monitoring virtual asset only, once detected trigger event data 203 is provided to virtual asset monitoring system 114, further investigative and protective action is taken, as needed.

However, as also noted above, in one embodiment, once detected trigger event data 203 is transferred from self-monitoring virtual asset 135 to trigger event reporting data receipt module 115 of virtual asset monitoring module 211 of virtual asset monitoring system 114, trigger event data 203 is analyzed. In one embodiment, the analysis of trigger event data 203 is performed using mapping module 214.

In one embodiment, mapping module 214 is used to map the detected trigger event indicated in detected trigger event data 203 to one or more of, responsive action A data 215, responsive action B data 216, and/or responsive action C data 217. In the specific illustrative example shown in FIG.

2, detected trigger event data 203 is mapped to responsive action A data 215 by mapping module 214.

In one embodiment, responsive action A data 215 is then provided to responsive action implementation data receipt logic 206 of self-monitoring virtual asset 135 using either virtual asset self-reporting communication channel 151, or another communications channel, such as communications channel 159.

In one embodiment, once responsive action A data 215 is provided to responsive action implementation data receipt logic 206 of self-monitoring virtual asset 135, responsive action A data 215 is used by responsive action implementation logic 207 of self-monitoring virtual asset 135 to implement the specific responsive action associated with responsive action A data 215 within self-monitoring virtual asset 135.

As noted above, in one embodiment the self-monitoring virtual assets, and/or self-reporting virtual assets, are instantiated to include at least the virtual asset self-monitoring logic, the virtual asset self-reporting logic, and the virtual asset self-reporting communications logic, using a self-reporting virtual asset creation template.

Figure 3:
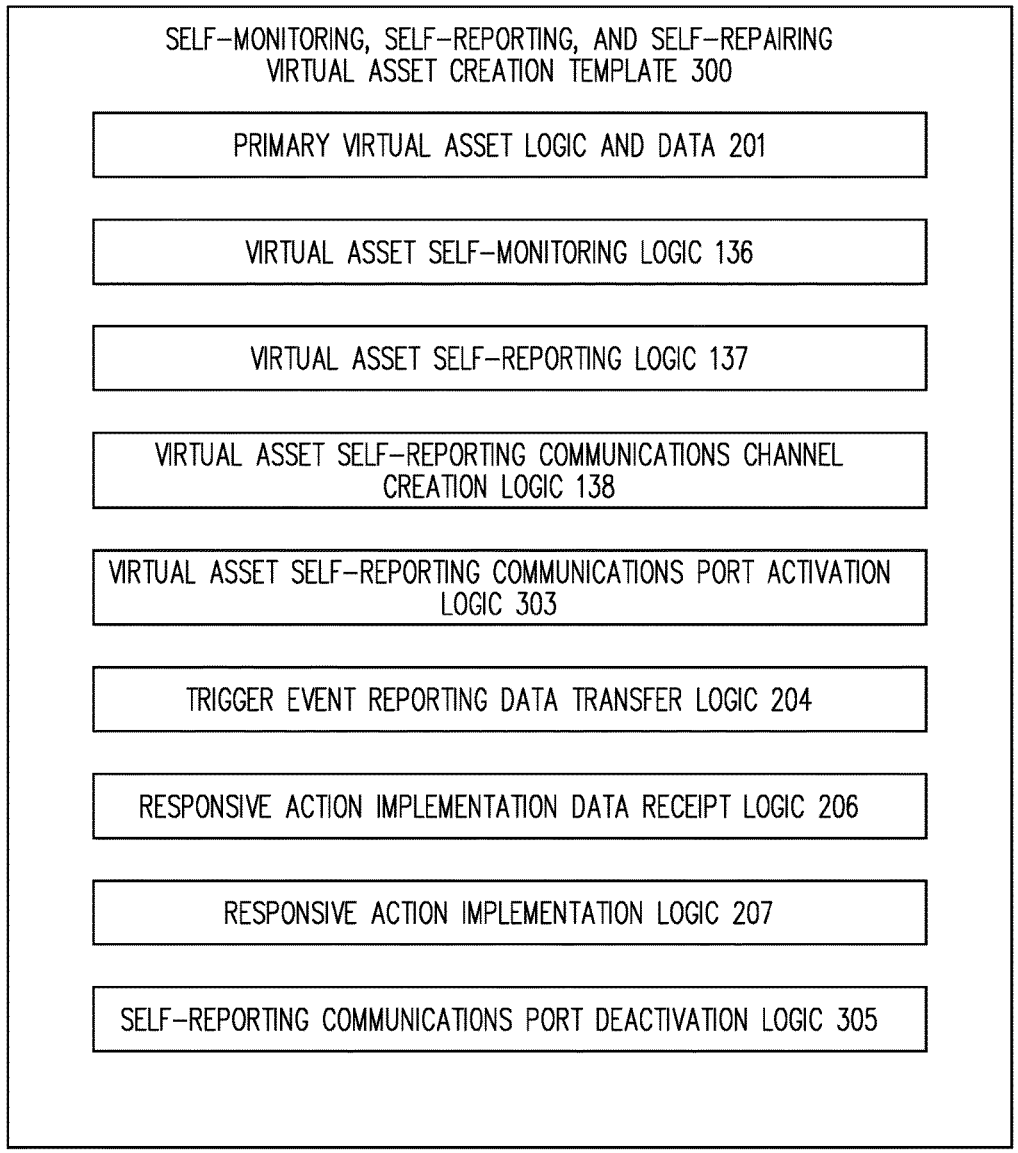
FIG. 3 is a functional diagram of a self-monitoring virtual asset creation template in accordance with one embodiment.

FIG. 3 shows a simplified block diagram of a self-reporting virtual asset creation template 300. As seen in FIG. 3, in one embodiment, self-monitoring virtual asset creation template 300 includes primary virtual asset logic and data 201.

In one embodiment, primary virtual asset logic and data 201 includes primary virtual asset logic and data, and instructions associated with the self-monitoring virtual asset itself, and/or the normal functions and operations of the self-monitoring virtual asset, and/or the operating environment of the self-monitoring virtual asset, such as a cloud computing environment and/or one or more management systems for the cloud computing environment.

As specific illustrative examples, in various embodiments, primary virtual asset logic and data 201 includes, but is not limited to, one or more of, data indicating the self-monitoring virtual asset's identification; data indicating the region associated with the self-monitoring virtual asset; data indicating the availability zone associated with the self-monitoring virtual asset; data representing and/or indicating software modules and code residing within, or assigned to, the self-monitoring virtual asset; data indicating a number of software modules residing within, or associated with, the self-monitoring virtual asset; data representing or indicating files and/or file names residing within, or assigned to, the self-monitoring virtual asset; data representing and/or indicating the exact configuration of the self-monitoring virtual asset; data indicating a boot sequence for the self-monitoring virtual asset; any data provided by a hypervisor or virtualization layer associated with the self-monitoring virtual asset; any data provided from a cloud control plane associated with the self-monitoring virtual asset; any data provided by any management system associated with the computing environment of the self-monitoring virtual asset; communications and data transfer logic associated with the self-monitoring virtual asset, such as logic and instructions for providing "normal" communications channels and data transfer mechanisms to be used by self-monitoring virtual asset once the self-monitoring virtual asset is instantiated, and/or deployed; and/or any combination of "inside" or "normal" operational virtual asset logic and data as discussed herein, and/or as known in the art at the time of filing, and/or as developed after the time of filing.

In one embodiment, using at least part of primary virtual asset logic and data 201, a self-monitoring virtual asset can be instantiated, or launched, in a computing environment. In one embodiment, as a specific illustrative example, self-monitoring virtual asset is a self-monitoring virtual machine, or self-monitoring virtual server instance, to be launched in a cloud computing environment.

In one embodiment, self-monitoring virtual asset creation template 300 includes virtual asset self-monitoring logic 136, as discussed above.

In one embodiment, self-monitoring virtual asset creation template 300 includes virtual asset self-reporting logic 137, as discussed above.

In one embodiment, self-monitoring virtual asset creation template 300 includes virtual asset self-reporting communication channel creation logic 138, as discussed above.

In one embodiment, self-monitoring virtual asset creation template 300 includes virtual asset self-reporting communication port activation logic 303. In one embodiment, virtual asset self-reporting communication port activation logic 303 includes instructions and data for generating and activating a self-reporting communications door in response to detection of a trigger event by virtual asset self-monitoring logic 136 and instructions from virtual asset self-reporting communications channel creation logic 138.

In one embodiment, self-monitoring virtual asset creation template 300 includes trigger event reporting data transfer logic 204, as discussed above.

In one embodiment, self-monitoring virtual asset creation template 300 includes responsive action implementation data receipt logic 206, as discussed above.

In one embodiment, self-monitoring virtual asset creation template 300 includes responsive action implementation logic 207, as discussed above.

In one embodiment, self-monitoring virtual asset creation template 300 includes virtual asset self-reporting communication port deactivation logic 305. In one embodiment, virtual asset self-reporting communication port deactivation logic 305 includes instructions and data for deactivating the self-reporting communications door in response instructions from virtual asset self-reporting communications channel creation logic 138.

Using the methods and systems for providing self-monitoring, and/or self-reporting virtual assets, discussed herein, self-monitoring, and/or self-reporting virtual assets are provided that can independently and automatically detect one or more trigger events within the self-monitoring, and/or self-reporting virtual assets, generate suspicious event reporting data from the self-monitoring, and/or self-reporting virtual assets, and provide the reporting data to a monitoring system external to the self-monitoring, and/or self-reporting virtual assets, all without relying detection of the suspicious event by entities outside the self-monitoring virtual assets, and/or self-reporting virtual assets, and/or normal communications channels.

Therefore, using the self-monitoring, and/or self-reporting virtual assets, and the methods and systems for providing self-monitoring, and/or self-reporting virtual assets discussed herein, virtual assets, and the data processed and stored by virtual assets, are made more secure.

Process

In one embodiment, a self-monitoring virtual asset is instantiated including virtual asset self-monitoring logic, virtual asset self-reporting logic, and virtual asset self-reporting communications channel creation logic.

In one embodiment, when a trigger event is detected in the self-monitoring virtual asset using the virtual asset self-monitoring logic, the self-monitoring virtual asset uses the virtual asset self-reporting logic to generate trigger event reporting data indicating the detected trigger event.

In one embodiment, the self-monitoring virtual asset then uses the virtual asset self-reporting communications channel creation logic to open a self-reporting communications channel between the self-monitoring virtual asset and a virtual asset monitoring system. In one embodiment, the self-monitoring virtual asset then uses the self-reporting communications channel to report the trigger event to the virtual asset monitoring system.

Figure 4:
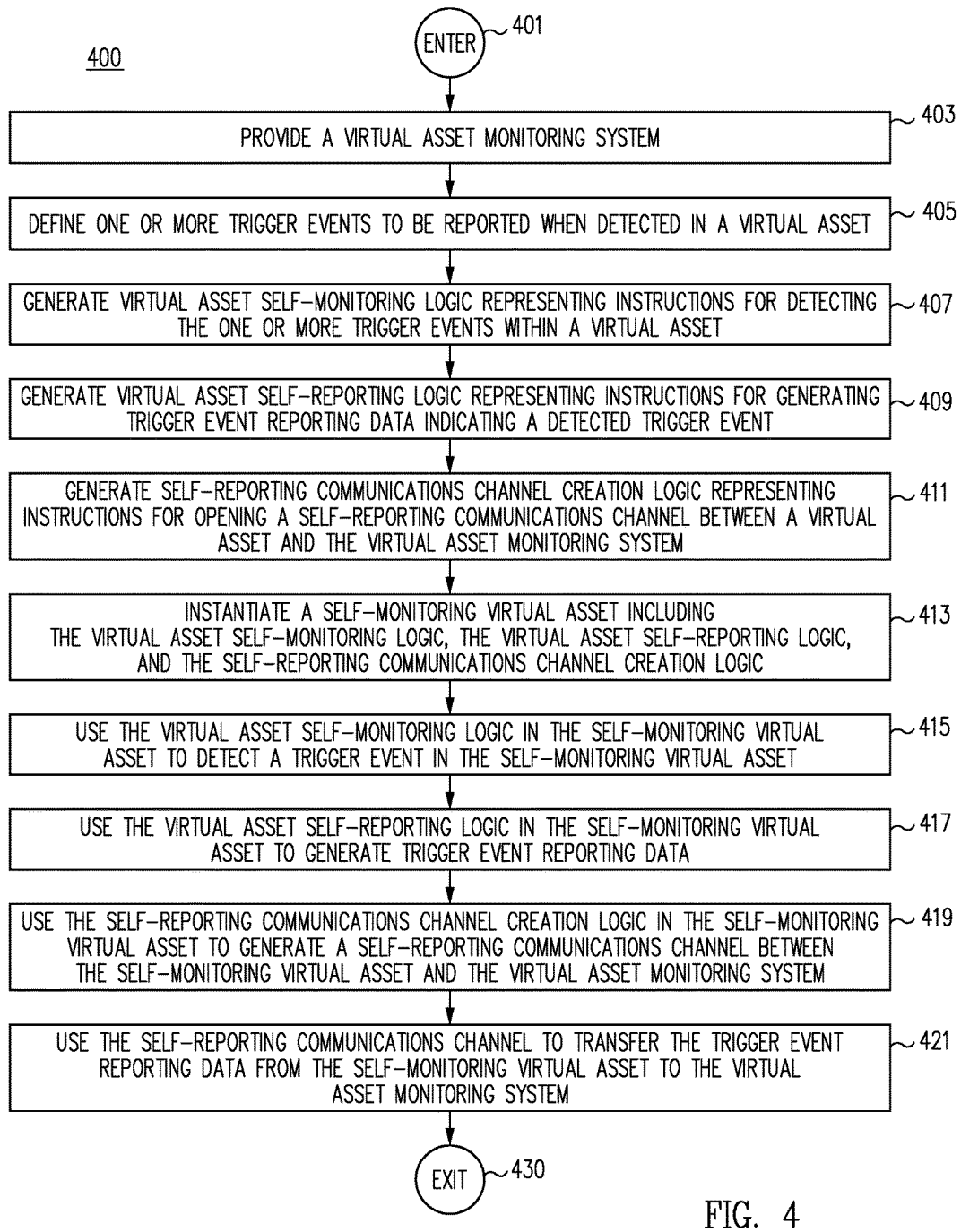
FIG. 4 is a flow chart depicting a process for enabling self-monitoring virtual assets to correlate external events with characteristic patterns associated with the virtual assets in accordance with one embodiment.

FIG. 4 is a flow chart of a process 400 for providing self-monitoring virtual assets in accordance with one embodiment. In one embodiment, process 400 for providing self-monitoring virtual assets begins at ENTER OPERATION 401 of FIG. 4 and process flow proceeds to PROVIDE A VIRTUAL ASSET MONITORING SYSTEM OPERATION 403.

In one embodiment, at PROVIDE A VIRTUAL ASSET MONITORING SYSTEM OPERATION 403, a virtual asset monitoring system is provided.

In one embodiment, at PROVIDE A VIRTUAL ASSET MONITORING SYSTEM OPERATION 403 the virtual asset monitoring system is implemented in a first computing environment that is distinct from the computing environment in which the self-monitoring virtual assets are implemented, operated, and/or instantiated.

In one embodiment, at PROVIDE A VIRTUAL ASSET MONITORING SYSTEM OPERATION 403 the virtual asset monitoring system is implemented, at least in part, in a data center associated with an application being implemented and/or an owner of the self-monitoring virtual assets.

In various embodiments, at PROVIDE A VIRTUAL ASSET MONITORING SYSTEM OPERATION 403 the virtual asset monitoring system is implemented in software, hardware, and/or a combination of software and hardware.

In one embodiment, at PROVIDE A VIRTUAL ASSET MONITORING SYSTEM OPERATION 403 the virtual asset monitoring system includes a virtual asset monitoring module. In one embodiment, at PROVIDE A VIRTUAL ASSET MONITORING SYSTEM OPERATION 403 the virtual asset monitoring module of the virtual asset monitoring system includes a trigger event reporting data receipt module which is used to receive detected trigger event data from the self-monitoring virtual assets.

In one embodiment, once a virtual asset monitoring system is provided at PROVIDE A VIRTUAL ASSET MONITORING SYSTEM OPERATION 403, process flow proceeds to DEFINE ONE OR MORE TRIGGER EVENTS TO BE REPORTED WHEN DETECTED IN A VIRTUAL ASSET OPERATION 405.

In one embodiment, at DEFINE ONE OR MORE TRIGGER EVENTS TO BE REPORTED WHEN DETECTED IN A VIRTUAL ASSET OPERATION 405, one or more trigger events are defined.

In various embodiments, the one or more trigger events defined at DEFINE ONE OR MORE TRIGGER EVENTS TO BE REPORTED WHEN DETECTED IN A VIRTUAL ASSET OPERATION 405 are events, states, or occurrences, that when detected in a virtual asset represent a potential security vulnerability, and/or a deviation from normal virtual asset operation.

In various embodiments, the one or more trigger events defined at DEFINE ONE OR MORE TRIGGER EVENTS TO BE REPORTED WHEN DETECTED IN A VIRTUAL ASSET OPERATION 405 can include, but are not limited to, one or more of, a network message from a virtual asset directed to a location known to be associated with malicious entities, i.e., a black-listed destination; the frequency of outgoing network messages changing to a level above a defined threshold level, i.e., the frequency of outgoing network messages changing to a level deemed "not normal"; a response to a customer request being directed to a destination that is not the customer location of record; a virtual asset receiving a high-frequency of login attempts that fail; a size of the parameters sent into a virtual asset being outside a defined "normal" range of sizes for parameters; a size of outgoing network messages being outside a defined "normal" range of sizes of outgoing messages; a total amount of data in any one communication connection of a virtual asset exceeding a defined maximum normal size of a communication to a customer; a request to a virtual asset coming in from a location known to be associated with malicious entities, i.e., a black-listed origin location; an internal elapsed time of defined critical operations changing to a time outside a defined range of "normal" values; and/or any other trigger event, or combination of trigger events, as discussed herein, and/or as known in the art at the time of filing, and/or as developed/made available after the time of filing.

In one embodiment, once one or more trigger events are defined at DEFINE ONE OR MORE TRIGGER EVENTS TO BE REPORTED WHEN DETECTED IN A VIRTUAL ASSET OPERATION 405, process flow proceeds to GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 407.

In one embodiment, at GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 407 virtual asset self-monitoring logic is generated for monitoring the operational logic of a virtual asset and detecting the one or more defined trigger events of DEFINE ONE OR MORE TRIGGER EVENTS TO BE REPORTED WHEN DETECTED IN A VIRTUAL ASSET OPERATION 405.

In one embodiment, the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 407 includes machine-readable code and instructions for monitoring the primary operational logic and data of the virtual asset and detecting the one or more defined trigger events within the virtual asset.

In one embodiment, once virtual asset self-monitoring logic is generated for monitoring the operational logic of a virtual asset and detecting the one or more defined trigger events of DEFINE ONE OR MORE TRIGGER EVENTS TO BE REPORTED WHEN DETECTED IN A VIRTUAL ASSET OPERATION 405 at GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 407, process flow proceeds to GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 409.

In one embodiment, at GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 409, virtual asset self-reporting logic is generated for generating trigger event reporting data indicating a detected trigger event of DEFINE ONE OR MORE TRIGGER EVENTS TO BE REPORTED WHEN DETECTED IN A VIRTUAL ASSET OPERATION 405 if one of the one or more trigger events is detected in a virtual asset by the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 407.

In one embodiment, the virtual asset self-reporting logic of GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 409 includes machine-readable code and instructions for creating detected trigger event data indicating a detected trigger event, and/or describing the detected trigger event, and/or generating log data representing the detected trigger event.

In one embodiment, once virtual asset self-reporting logic is generated for generating trigger event reporting data indicating a detected trigger event of DEFINE ONE OR MORE TRIGGER EVENTS TO BE REPORTED WHEN DETECTED IN A VIRTUAL ASSET OPERATION 405 if one of the one or more trigger events is detected in a virtual asset by the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 407 at GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 409, process flow proceeds to GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 411.

In one embodiment, at GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 411, virtual asset self-reporting communications channel creation logic is generated for opening a self-reporting communications channel between a virtual asset and the virtual asset monitoring system of PROVIDE A VIRTUAL ASSET MONITORING SYSTEM OPERATION 403 if one of the one or more trigger events of DEFINE ONE OR MORE TRIGGER EVENTS TO BE REPORTED WHEN DETECTED IN A VIRTUAL ASSET OPERATION 405 is detected in a virtual asset by the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 407.

In one embodiment, the virtual asset self-reporting communication channel creation logic of GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 411 includes machine-readable code and instructions for activating a virtual asset self-reporting communications port, or door, pre-deployed, and/or implemented by, the virtual asset self-reporting communications channel creation logic in the virtual asset and thereby opening a self-reporting communications channel between a virtual asset and the virtual asset monitoring system.

In one embodiment, once virtual asset self-reporting communications channel creation logic is generated for opening a self-reporting communications channel between a virtual asset and the virtual asset monitoring system of PROVIDE A VIRTUAL ASSET MONITORING SYSTEM OPERATION 403 when one of the one or more trigger events of DEFINE ONE OR MORE TRIGGER EVENTS TO BE REPORTED WHEN DETECTED IN A VIRTUAL ASSET OPERATION 405 is detected in a virtual asset by the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 407 at GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 411, process flow proceeds to INSTANTIATE A SELF-MONITORING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 413.

In one embodiment, at INSTANTIATE A SELF-MONITORING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 413, one or more self-monitoring virtual assets are instantiated in a computing environment.

In one embodiment, at INSTANTIATE A SELF-MONITORING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 413 the one or more self-monitoring virtual assets are instantiated in a second computing environment that is distinct from the first computing environment in which the virtual asset monitoring system of PROVIDE A VIRTUAL ASSET MONITORING SYSTEM OPERATION 403 is implemented.

In one embodiment, at INSTANTIATE A SELF-MONITORING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 413 the one or more self-monitoring virtual assets are instantiated in a cloud computing environment that is distinct from a data center in which the virtual asset monitoring system of PROVIDE A VIRTUAL ASSET MONITORING SYSTEM OPERATION 403 is implemented.

As noted above, as used herein, the term "virtual asset", such as used in the term "self-monitoring virtual asset" includes any virtualized entity or resource, and/or part of an actual, or "bare metal" entity.

In various embodiments, any, or all, of the assets making up a given production environment, the computing systems, and/or computing entities discussed herein, and/or as known in the art at the time of filing, and/or as developed after the time of filing, can be implemented as virtual assets, and more particularly as, self-monitoring virtual assets.

As also noted above, virtual assets, including self-monitoring virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system.

Other examples of virtual asset creation templates include, but are not limited to, any virtual appliance used to instantiate virtual assets. One specific illustrative example of such a virtual asset creation template is an Amazon Machine Image (AMI).

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

In one embodiment, the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 407, the virtual asset self-reporting logic of GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 409, and the virtual asset self-reporting communications channel creation logic of GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 411, are provided to each of the one or more self-monitoring virtual assets instantiated at INSTANTIATE A SELF-MONITORING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 413.

In one embodiment, the virtual asset self-monitoring logic, the virtual asset self-reporting logic, and the virtual asset self-reporting communications channel creation logic, are provided to each of the one or more self-monitoring virtual assets instantiated in the computing environment at INSTANTIATE A SELF-MONITORING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 413 using one or more self-monitoring virtual asset creation templates.

In one embodiment, once one or more self-monitoring virtual assets are instantiated in a computing environment at INSTANTIATE A SELF-MONITORING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 413, process flow proceeds to USE THE VIRTUAL ASSET SELF-MONITORING LOGIC IN THE SELF-MONITORING VIRTUAL ASSET TO DETECT A TRIGGER EVENT IN THE SELF-MONITORING VIRTUAL ASSET OPERATION 415.

In one embodiment, at USE THE VIRTUAL ASSET SELF-MONITORING LOGIC IN THE SELF-MONITORING VIRTUAL ASSET TO DETECT A TRIGGER EVENT IN THE SELF-MONITORING VIRTUAL ASSET OPERATION 415, the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 407 provided to the one or more self-monitoring virtual assets at INSTANTIATE A SELF-MONITORING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 413 is used to monitor and detect any of the defined trigger events of DEFINE ONE OR MORE TRIGGER EVENTS TO BE REPORTED WHEN DETECTED IN A VIRTUAL ASSET OPERATION 405 within the self-monitoring virtual assets.

In one embodiment, at USE THE VIRTUAL ASSET SELF-MONITORING LOGIC IN THE SELF-MONITORING VIRTUAL ASSET TO DETECT A TRIGGER EVENT IN THE SELF-MONITORING VIRTUAL ASSET OPERATION 415 the virtual asset self-monitoring logic is used to monitor and detect any of the defined trigger events within the self-monitoring virtual assets by monitoring primary virtual asset logic and data used by the self-monitoring virtual assets in the course of their normal operations and the performance of their assigned functions.

In one embodiment, once the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 407 provided to the one or more self-monitoring virtual assets at INSTANTIATE A SELF-MONITORING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 413 is used to monitor and detect any of the defined trigger events of DEFINE ONE OR MORE TRIGGER EVENTS TO BE REPORTED WHEN DETECTED IN A VIRTUAL ASSET OPERATION 405 within the self-monitoring virtual assets at USE THE VIRTUAL ASSET SELF-MONITORING LOGIC IN THE SELF-MONITORING VIRTUAL ASSET TO DETECT A TRIGGER EVENT IN THE SELF-MONITORING VIRTUAL ASSET OPERATION 415, process flow proceeds to USE THE VIRTUAL ASSET SELF- REPORTING LOGIC IN THE SELF-MONITORING VIRTUAL ASSET TO GENERATE TRIGGER EVENT REPORTING DATA OPERATION 417.

In one embodiment, if one of the defined trigger events is detected within one of the self-monitoring virtual assets by the virtual asset self-monitoring logic at USE THE VIRTUAL ASSET SELF-MONITORING LOGIC IN THE SELF-MONITORING VIRTUAL ASSET TO DETECT A TRIGGER EVENT IN THE SELF-MONITORING VIRTUAL ASSET OPERATION 415, then at USE THE VIRTUAL ASSET SELF-REPORTING LOGIC IN THE SELF-MONITORING VIRTUAL ASSET TO GENERATE TRIGGER EVENT REPORTING DATA OPERATION 417 detected trigger event data associated with, describing, or representing log data associated with, the detected trigger event is generated by the virtual asset self-reporting logic of GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 409 provided to the affected self-monitoring virtual asset at INSTANTIATE A SELF-MONITORING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 413.

In one embodiment, once detected trigger event data associated with, describing, or representing log data associated with, the detected trigger event is generated by the virtual asset self-reporting logic provided to the affected self-monitoring at USE THE VIRTUAL ASSET SELF-REPORTING LOGIC IN THE SELF-MONITORING VIRTUAL ASSET TO GENERATE TRIGGER EVENT REPORTING DATA OPERATION 417, process flow proceeds to USE THE SELF-REPORTING COMMUNICATIONS CHANNEL CREATION LOGIC IN THE SELF-MONITORING VIRTUAL ASSET TO GENERATE A SELF-REPORTING COMMUNICATIONS CHANNEL BETWEEN THE SELF-MONITORING VIRTUAL ASSET AND THE VIRTUAL ASSET MONITORING SYSTEM OPERATION 419.

In one embodiment, once a defined trigger event is detected within the self-monitoring virtual asset by the virtual asset self-monitoring logic at USE THE VIRTUAL ASSET SELF-MONITORING LOGIC IN THE SELF-MONITORING VIRTUAL ASSET TO DETECT A TRIGGER EVENT IN THE SELF-MONITORING VIRTUAL ASSET OPERATION 415, at USE THE SELF-REPORTING COMMUNICATIONS CHANNEL CREATION LOGIC IN THE SELF-MONITORING VIRTUAL ASSET TO GENERATE A SELF-REPORTING COMMUNICATIONS CHANNEL BETWEEN THE SELF-MONITORING VIRTUAL ASSET AND THE VIRTUAL ASSET MONITORING SYSTEM OPERATION 419 the virtual asset self-reporting communications channel creation logic of GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 411 provided to the self-monitoring virtual asset at INSTANTIATE A SELF-MONITORING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 413, is used to generate a self-reporting communications channel between the self-monitoring virtual asset and the virtual asset monitoring system of PROVIDE A VIRTUAL ASSET MONITORING SYSTEM OPERATION 403.

As noted above, in one embodiment, the virtual asset self-reporting communications channel creation logic of GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 411 generates a self-reporting communications channel at USE THE SELF-REPORTING COMMUNICATIONS CHANNEL CREATION LOGIC IN THE SELF-MONITORING VIRTUAL ASSET TO GENERATE A SELF-REPORTING COMMUNICATIONS CHANNEL BETWEEN THE SELF-MONITORING VIRTUAL ASSET AND THE VIRTUAL ASSET MONITORING SYSTEM OPERATION 419 by activating a self-monitoring virtual asset self-reporting communications port pre-deployed, and/or implemented by, the virtual asset self-reporting communications channel creation logic.

In one embodiment, the self-reporting communications channel generated by the virtual asset self-reporting communications channel creation logic at USE THE SELF-REPORTING COMMUNICATIONS CHANNEL CREATION LOGIC IN THE SELF-MONITORING VIRTUAL ASSET TO GENERATE A SELF-REPORTING COMMUNICATIONS CHANNEL BETWEEN THE SELF-MONITORING VIRTUAL ASSET AND THE VIRTUAL ASSET MONITORING SYSTEM OPERATION 419 is a communications channel distinct, and separate from, the various other "normal" communications channels utilized by the self-monitoring virtual assets and/or other assets within the computing environment, and/or production environment, associated with the self-monitoring virtual assets.

Consequently, in one embodiment, the self-reporting communications channel generated by the virtual asset self-reporting communications channel creation logic at USE THE SELF-REPORTING COMMUNICATIONS CHANNEL CREATION LOGIC IN THE SELF-MONITORING VIRTUAL ASSET TO GENERATE A SELF-REPORTING COMMUNICATIONS CHANNEL BETWEEN THE SELF-MONITORING VIRTUAL ASSET AND THE VIRTUAL ASSET MONITORING SYSTEM OPERATION 419 is not subject to manipulation, and/or termination, by a malicious party that may have taken control of the self-monitoring virtual asset. In addition, the self-reporting communications channel generated by the virtual asset self-reporting communications channel creation logic is not dependent on security policy implementation systems and entities outside of the self-monitoring virtual asset, other than the virtual asset monitoring system.

In one embodiment, once the virtual asset self-reporting communications channel creation logic of GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 411 provided to the self-monitoring virtual asset at INSTANTIATE A SELF-MONITORING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 413, is used to generate a self-reporting communications channel between the self-monitoring virtual asset and the virtual asset monitoring system of PROVIDE A VIRTUAL ASSET MONITORING SYSTEM OPERATION 403 at USE THE SELF-REPORTING COMMUNICATIONS CHANNEL CREATION LOGIC IN THE SELF-MONITORING VIRTUAL ASSET TO GENERATE A SELF-REPORTING COMMUNICATIONS CHANNEL BETWEEN THE SELF-MONITORING VIRTUAL ASSET AND THE VIRTUAL ASSET MONITORING SYSTEM OPERATION 419, process flow proceeds to USE THE SELF-REPORTING COMMUNICATIONS CHANNEL TO TRANSFER THE TRIGGER EVENT REPORTING DATA FROM THE SELF-MONITORING VIRTUAL ASSET TO THE VIRTUAL ASSET MONITORING SYSTEM OPERATION 421.

In one embodiment, at USE THE SELF-REPORTING COMMUNICATIONS CHANNEL TO TRANSFER THE TRIGGER EVENT REPORTING DATA FROM THE SELF-MONITORING VIRTUAL ASSET TO THE VIRTUAL ASSET MONITORING SYSTEM OPERATION 421 the detected trigger event data of USE THE VIRTUAL ASSET SELF-REPORTING LOGIC IN THE SELF-MONITORING VIRTUAL ASSET TO GENERATE TRIGGER EVENT REPORTING DATA OPERATION 417 is transferred from the self-monitoring virtual asset to the virtual asset monitoring system of PROVIDE A VIRTUAL ASSET MONITORING SYSTEM OPERATION 403 using the virtual asset self-reporting communications channel generated by the virtual asset self-reporting communications channel creation logic at USE THE SELF-REPORTING COMMUNICATIONS CHANNEL CREATION LOGIC IN THE SELF-MONITORING VIRTUAL ASSET TO GENERATE A SELF-REPORTING COMMUNICATIONS CHANNEL BETWEEN THE SELF-MONITORING VIRTUAL ASSET AND THE VIRTUAL ASSET MONITORING SYSTEM OPERATION 419.

In one embodiment, once the detected trigger event data of USE THE VIRTUAL ASSET SELF-REPORTING LOGIC IN THE SELF-MONITORING VIRTUAL ASSET TO GENERATE TRIGGER EVENT REPORTING DATA OPERATION 417 is transferred from the self-monitoring virtual asset to the virtual asset monitoring system of PROVIDE A VIRTUAL ASSET MONITORING SYSTEM OPERATION 403 using the virtual asset self-reporting communications channel generated by the virtual asset self-reporting communications channel creation logic at USE THE SELF-REPORTING COMMUNICATIONS CHANNEL TO TRANSFER THE TRIGGER EVENT REPORTING DATA FROM THE SELF-MONITORING VIRTUAL ASSET TO THE VIRTUAL ASSET MONITORING SYSTEM OPERATION 421, process flow proceeds to EXIT OPERATION 430.

In one embodiment, at EXIT OPERATION 430 process 400 is exited to await new data.

Using the self-monitoring virtual assets of process 400, self-monitoring virtual assets are provided that can independently and automatically detect one or more trigger events within the self-monitoring virtual assets, generate suspicious event reporting data from the self-monitoring virtual assets, and provide the reporting data to a monitoring system external to self-monitoring virtual assets, all without relying detection of the suspicious event by entities outside the self-monitoring virtual assets themselves, and/or normal communications channels.

Therefore, using the self-monitoring virtual assets, and the methods and systems for providing self-monitoring virtual assets discussed herein, virtual assets, and the data processed and stored by virtual assets, are made more secure.

In the specific illustrative embodiments discussed above where the detected trigger event is detected in a self-monitoring virtual asset, once the detected trigger event data is transferred from the self-monitoring virtual asset to the virtual asset monitoring system, analysis is performed at the virtual asset monitoring system and appropriate investigative and/or protective action is taken in response to the detected trigger event.

However, where the detected trigger event is detected in a self-reporting virtual asset, once the detected trigger event data is transferred from the self-monitoring virtual asset to the virtual asset monitoring system, further analysis and actions are taken automatically.

In one embodiment, a self-reporting virtual asset is instantiated including virtual asset self-monitoring logic, virtual asset self-reporting logic, and virtual asset self-reporting communications channel creation logic.

In one embodiment, when a trigger event is detected in the self-monitoring virtual asset using the virtual asset self-monitoring logic, the self-monitoring virtual asset uses the virtual asset self-reporting logic to generate trigger event reporting data indicating the detected trigger event.

In one embodiment, the self-monitoring virtual asset then uses the virtual asset self-reporting communications channel creation logic to open a self-reporting communications channel between the self-monitoring virtual asset and a virtual asset monitoring system. In one embodiment, the self-monitoring virtual asset then uses the self-reporting communications channel to report the trigger event to the virtual asset monitoring system.

In one embodiment, responsive action implementation data representing instructions for implementing one or more responsive actions to the trigger event is then generated and sent to the self-monitoring virtual asset where the self-monitoring virtual asset uses the responsive action implementation data to respond to the trigger event.

Figure 5:
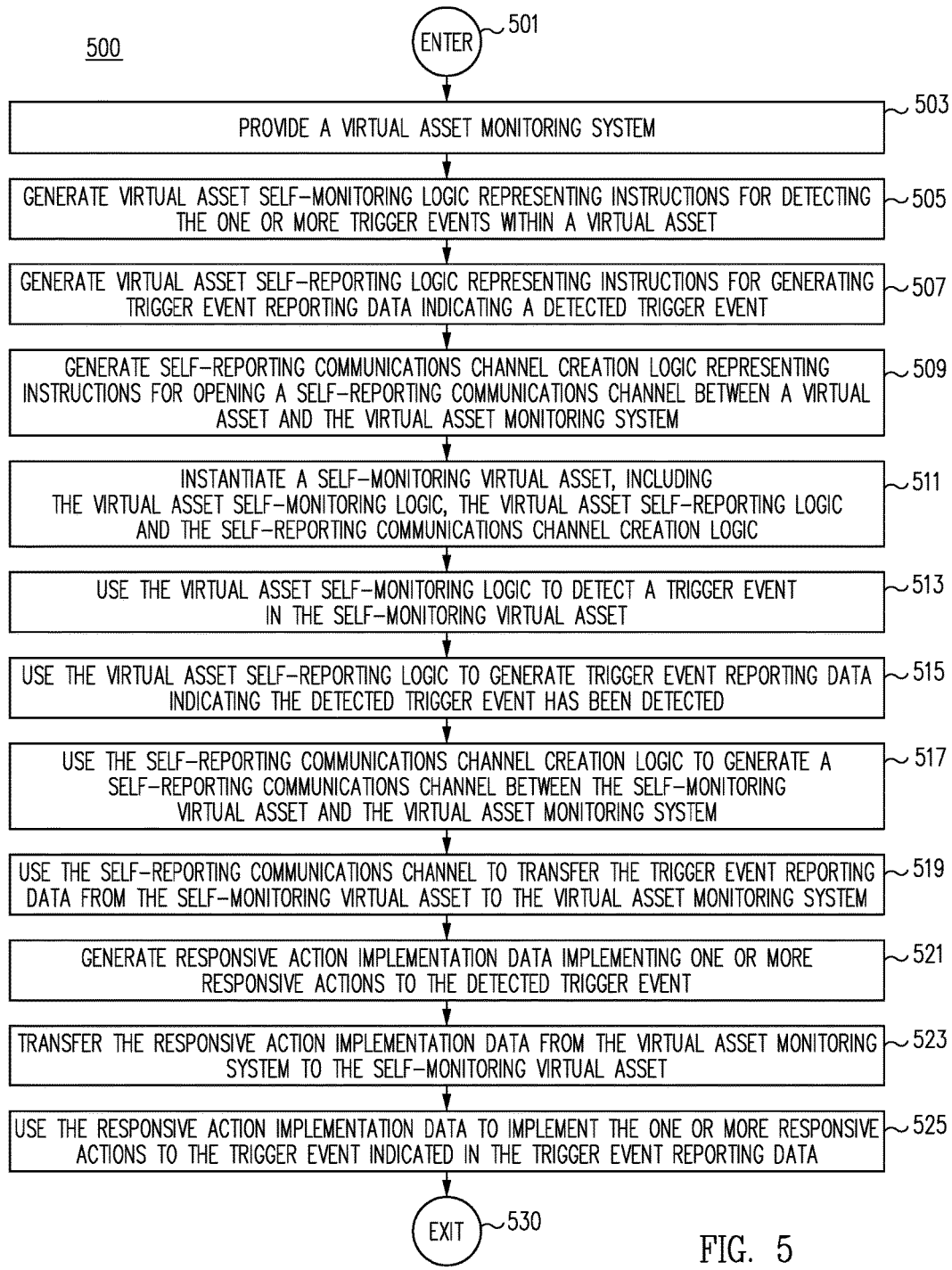
FIG. 5 is a flow chart depicting a process for enabling self-monitoring virtual assets to correlate external events with characteristic patterns associated with the virtual assets in accordance with one embodiment.

FIG. 5 is a flow chart of a process 500 for providing self-monitoring virtual assets in accordance with one embodiment. In one embodiment, process 500 for providing self-monitoring virtual assets begins at ENTER OPERATION 501 of FIG. 5 and process flow proceeds to PROVIDE A VIRTUAL ASSET MONITORING SYSTEM OPERATION 503.

In one embodiment, at PROVIDE A VIRTUAL ASSET MONITORING SYSTEM OPERATION 503, a virtual asset monitoring system is provided.

In one embodiment, the virtual asset monitoring system of PROVIDE A VIRTUAL ASSET MONITORING SYSTEM OPERATION 503 is implemented in a first computing environment that is distinct from the computing environment in which the self-monitoring virtual assets are implemented, operated, and/or instantiated.

In one embodiment, the virtual asset monitoring system of PROVIDE A VIRTUAL ASSET MONITORING SYSTEM OPERATION 503 is implemented, at least in part, in a data center associated with the application being implemented, and/or an owner of the self-monitoring virtual assets. In various embodiments, the virtual asset monitoring system is implemented in software, hardware, and/or a combination of software and hardware.

In one embodiment, the virtual asset monitoring system of PROVIDE A VIRTUAL ASSET MONITORING SYSTEM OPERATION 503 includes a virtual asset monitoring module and a response action implementation module.

In one embodiment, the virtual asset monitoring module of the virtual asset monitoring system of PROVIDE A VIRTUAL ASSET MONITORING SYSTEM OPERATION 503 includes a trigger event reporting data receipt module which, as discussed below, is used to receive detected trigger event data from the self-monitoring virtual assets.

In one embodiment, the responsive action implementation module of the virtual asset monitoring system of PROVIDE A VIRTUAL ASSET MONITORING SYSTEM OPERATION 503 includes the capability to analyze the detected trigger event data received from the self-monitoring virtual assets. In one embodiment, the analysis capability of the responsive action implementation module takes the form of a mapping module used to map specific detected trigger event data to specific responsive action data.

In a specific illustrative example, in one embodiment, the responsive action implementation module receives the detected trigger event data from the trigger event reporting data receipt module and a mapping module is used to analyze the detected trigger event data and identify the detected trigger event. In this specific illustrative example, the mapping module then maps the detected trigger event to a specific responsive action represented and implemented by associated responsive action data.

In one embodiment, once a virtual asset monitoring system is provided at PROVIDE A VIRTUAL ASSET MONITORING SYSTEM OPERATION 503, process flow proceeds to GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 505.

In one embodiment, at GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 505, one or more trigger events are defined and virtual asset self-monitoring logic is generated for monitoring the operational logic of a virtual asset and detecting the one or more defined trigger events.

In various embodiments, the one or more trigger events defined at GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 505 are events, states, or occurrences, that when detected in a virtual asset represent a potential security vulnerability, and/or a deviation from normal virtual asset operation.

In various embodiments, the one or more trigger events defined at GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 505 can include, but are not limited to, one or more of, a network message from a virtual asset directed to a location known to be associated with malicious entities, i.e., a black-listed destination; the frequency of outgoing network messages changing to a level above a defined threshold level, i.e., the frequency of outgoing network messages changing to a level deemed "not normal"; a response to a customer request being directed to a destination that is not the customer location of record; a virtual asset receiving a high-frequency of login attempts that fail; a size of the parameters sent into a virtual asset being outside a defined "normal" range of sizes for parameters; a size of outgoing network messages being outside a defined "normal" range of sizes of outgoing messages; a total amount of data in any one communication connection of a virtual asset exceeding a defined maximum normal size of a communication to a customer; a request to a virtual asset coming in from a location known to be associated with malicious entities, i.e., a black-listed origin location; an internal elapsed time of defined critical operations changing to a time outside a defined range of "normal" values; and/or any other trigger event, or combination of trigger events, as discussed herein, and/or as known in the art at the time of filing, and/or as developed/made available after the time of filing.

In one embodiment, once one or more trigger events are defined at GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 505, virtual asset self-monitoring logic is generated for monitoring the operational logic of a virtual asset and detecting the one or more defined trigger events.

In one embodiment, the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 505 includes machine-readable code and instructions for monitoring the operational logic of the virtual asset and detecting the one or more defined trigger events within the virtual asset In one embodiment, once one or more trigger events are defined and virtual asset self-monitoring logic is generated for monitoring the operational logic of a virtual asset and detecting the one or more defined trigger events at GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 505, process flow proceeds to GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 507.

In one embodiment, at GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 507, virtual asset self-reporting logic is generated for generating trigger event reporting data indicating a detected trigger event if one of the one or more trigger events is detected in a virtual asset by the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 505.

In one embodiment, the virtual asset self-reporting logic of GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 507 includes machine-readable code and instructions for creating detected trigger event data indicating a detected trigger event, and/or describing the detected trigger event, and/or generating log data representing the detected trigger event.

In one embodiment, once virtual asset self-reporting logic is generated for generating trigger event reporting data indicating a detected trigger event if one of the one or more trigger events is detected in a virtual asset by the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 505 at GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 507, process flow proceeds to GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 509.

In one embodiment, at GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 509, virtual asset self-reporting communications channel creation logic is generated for opening a self-reporting communications channel between a virtual asset and the virtual asset monitoring system of PROVIDE A VIRTUAL ASSET MONITORING SYSTEM OPERATION 503 if one of the one or more trigger events is detected in a virtual asset by the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 505.

In one embodiment, the virtual asset self-reporting communication channel creation logic of GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 509 includes machine-readable code and instructions for activating a self-reporting communications port, or door, implemented by the virtual asset self-reporting communications channel creation logic in the virtual and thereby opening a self-reporting communications channel between a virtual asset and the virtual asset monitoring system.

In one embodiment, once virtual asset self-reporting communications channel creation logic is generated for opening a self-reporting communications channel between a virtual asset and the virtual asset monitoring system if one of the one or more trigger events is detected in a virtual asset by the virtual asset self-monitoring logic at GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 509, process flow proceeds to INSTANTIATE A SELF-REPORTING VIRTUAL ASSET, INCLUDING THE VIRTUAL ASSET SELF-MONITORING LOGIC, THE VIRTUAL ASSET SELF-REPORTING LOGIC AND THE SELF-REPORTING COMMUNICATIONS CHANNEL CREATION LOGIC OPERATION 511.

In one embodiment, at INSTANTIATE A SELF-REPORTING VIRTUAL ASSET, INCLUDING THE VIRTUAL ASSET SELF-MONITORING LOGIC, THE VIRTUAL ASSET SELF-REPORTING LOGIC AND THE SELF-REPORTING COMMUNICATIONS CHANNEL CREATION LOGIC OPERATION 511, one or more self-monitoring virtual assets, are instantiated in a computing environment.

In one embodiment, the one or more self-monitoring virtual assets, are instantiated at INSTANTIATE A SELF-MONITORING VIRTUAL ASSET, INCLUDING THE VIRTUAL ASSET SELF-MONITORING LOGIC, THE VIRTUAL ASSET SELF-REPORTING LOGIC AND THE SELF-REPORTING COMMUNICATIONS CHANNEL CREATION LOGIC OPERATION 511 in a second computing environment that is distinct from the first computing environment in which the virtual asset monitoring system is implemented.

In one embodiment, the one or more self-monitoring virtual assets, are instantiated at INSTANTIATE A SELF-MONITORING VIRTUAL ASSET, INCLUDING THE VIRTUAL ASSET SELF-MONITORING LOGIC, THE VIRTUAL ASSET SELF-REPORTING LOGIC AND THE SELF-REPORTING COMMUNICATIONS CHANNEL CREATION LOGIC OPERATION 511 in a cloud computing environment that is distinct from a data center in which the virtual asset monitoring system is implemented.

As noted above, as used herein, the term "virtual asset", such as used in the term "self-monitoring virtual asset" includes any virtualized entity or resource, and/or part of an actual, or "bare metal" entity.

In various embodiments, any, or all, of the assets making up a given production environment, the computing systems, and/or computing entities discussed herein, and/or as known in the art at the time of filing, and/or as developed after the time of filing, can be implemented as virtual assets, and more particularly as self-monitoring virtual assets.

In one embodiment, the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 505, the virtual asset self-reporting logic of GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 507, and the virtual asset self-reporting communications channel creation logic of GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 509, are provided to each of the one or more self-monitoring virtual assets of INSTANTIATE A SELF-MONITORING VIRTUAL ASSET, INCLUDING THE VIRTUAL ASSET SELF-MONITORING LOGIC, THE VIRTUAL ASSET SELF-REPORTING LOGIC AND THE SELF-REPORTING COMMUNICATIONS CHANNEL CREATION LOGIC OPERATION 511.

In one embodiment, at INSTANTIATE A SELF-REPORTING VIRTUAL ASSET, INCLUDING THE VIRTUAL ASSET SELF-MONITORING LOGIC, THE VIRTUAL ASSET SELF-REPORTING LOGIC AND THE SELF-REPORTING COMMUNICATIONS CHANNEL CREATION LOGIC OPERATION 511 the virtual asset self-monitoring logic, the virtual asset self-reporting logic, and the virtual asset self-reporting communications channel creation logic, are provided to each of the one or more self-monitoring virtual assets, using one or more self-monitoring virtual asset creation templates.

In one embodiment, once one or more self-monitoring virtual assets, are instantiated in a computing environment at INSTANTIATE A SELF-REPORTING VIRTUAL ASSET, INCLUDING THE VIRTUAL ASSET SELF-MONITORING LOGIC, THE VIRTUAL ASSET SELF-REPORTING LOGIC AND THE SELF-REPORTING COMMUNICATIONS CHANNEL CREATION LOGIC OPERATION 511, process flow proceeds to USE THE VIRTUAL ASSET SELF-MONITORING LOGIC TO DETECT A TRIGGER EVENT IN THE SELF-MONITORING VIRTUAL ASSET OPERATION 513.

In one embodiment, at USE THE VIRTUAL ASSET SELF-MONITORING LOGIC TO DETECT A TRIGGER EVENT IN THE SELF-MONITORING VIRTUAL ASSET OPERATION 513, the virtual asset self-monitoring logic provided to the self-monitoring virtual assets is used to monitor and detect any of the defined trigger events within the self-monitoring virtual assets.

In one embodiment, at USE THE VIRTUAL ASSET SELF-MONITORING LOGIC TO DETECT A TRIGGER EVENT IN THE SELF-MONITORING VIRTUAL ASSET OPERATION 513 the virtual asset self-monitoring logic is used to monitor and detect any of the defined trigger events within the self-monitoring virtual assets by monitoring primary virtual asset logic and data used by the self-monitoring virtual assets in the course of their normal operations and the performance of their assigned functions.

In one embodiment, once the virtual asset self-monitoring logic provided to the self-monitoring virtual assets is used to monitor and detect any of the defined trigger events within the self-monitoring virtual assets at USE THE VIRTUAL ASSET SELF-MONITORING LOGIC TO DETECT A TRIGGER EVENT IN THE SELF-MONITORING VIRTUAL ASSET OPERATION 513, process flow proceeds to USE THE VIRTUAL ASSET SELF-REPORTING LOGIC TO GENERATE TRIGGER EVENT REPORTING DATA INDICATING THE DETECTED TRIGGER EVENT HAS BEEN DETECTED OPERATION 515.

In one embodiment, if one of the defined trigger events is detected within an affected one of the self-monitoring virtual assets by the virtual asset self-monitoring logic at USE THE VIRTUAL ASSET SELF-MONITORING LOGIC TO DETECT A TRIGGER EVENT IN THE SELF-MONITORING VIRTUAL ASSET OPERATION 513, then, at USE THE VIRTUAL ASSET SELF-REPORTING LOGIC TO GENERATE TRIGGER EVENT REPORTING DATA INDICATING THE DETECTED TRIGGER EVENT HAS BEEN DETECTED OPERATION 515, detected trigger event data associated with, describing, or representing log data associated with, the detected trigger event is generated by the virtual asset self-reporting logic provided to the affected self-monitoring virtual asset.

In one embodiment, once detected trigger event data associated with, describing, or representing log data associated with, the detected trigger event is generated by the virtual asset self-reporting logic provided to the affected self-monitoring virtual asset at USE THE VIRTUAL ASSET SELF-REPORTING LOGIC TO GENERATE TRIGGER EVENT REPORTING DATA INDICATING THE DETECTED TRIGGER EVENT HAS BEEN DETECTED OPERATION 515, process flow proceeds to USE THE SELF-REPORTING COMMUNICATIONS CHANNEL CREATION LOGIC TO GENERATE A SELF-REPORTING COMMUNICATIONS CHANNEL BETWEEN THE SELF-MONITORING VIRTUAL ASSET AND THE VIRTUAL ASSET MONITORING SYSTEM OPERATION 517.

In one embodiment, once a defined trigger event is detected within the self-monitoring virtual asset by the virtual asset self-monitoring logic at USE THE SELF-REPORTING COMMUNICATIONS CHANNEL CREATION LOGIC TO GENERATE A SELF-REPORTING COMMUNICATIONS CHANNEL BETWEEN THE SELF-MONITORING VIRTUAL ASSET AND THE VIRTUAL ASSET MONITORING SYSTEM OPERATION 517, the virtual asset self-reporting communications channel creation logic provided to the self-monitoring virtual asset, is used to generate a self-reporting communications channel between the self-monitoring virtual asset and the virtual asset monitoring system.

As noted above, in one embodiment, at USE THE SELF-REPORTING COMMUNICATIONS CHANNEL CREATION LOGIC TO GENERATE A SELF-REPORTING COMMUNICATIONS CHANNEL BETWEEN THE SELF-MONITORING VIRTUAL ASSET AND THE VIRTUAL ASSET MONITORING SYSTEM OPERATION 517, the virtual asset self-reporting communications channel creation logic generates a self-reporting communications channel by activating a self-monitoring virtual asset self-reporting communications port pre-deployed, and/or implemented by, the virtual asset self-reporting communications channel creation logic.

In one embodiment, the self-reporting communications channel generated by the virtual asset self-reporting communications channel creation logic at USE THE SELF-REPORTING COMMUNICATIONS CHANNEL CREATION LOGIC TO GENERATE A SELF-REPORTING COMMUNICATIONS CHANNEL BETWEEN THE SELF-MONITORING VIRTUAL ASSET AND THE VIRTUAL ASSET MONITORING SYSTEM OPERATION 517 is a communications channel distinct, and separate from, the various other "normal" communications channels utilized by the self-monitoring virtual assets, and/or other assets within the computing environment, and/or production environment, associated with the self-monitoring virtual assets.

Consequently, in one embodiment, the self-reporting communications channel generated by the virtual asset self-reporting communications channel creation logic at USE THE SELF-REPORTING COMMUNICATIONS CHANNEL CREATION LOGIC TO GENERATE A SELF-REPORTING COMMUNICATIONS CHANNEL BETWEEN THE SELF-MONITORING VIRTUAL ASSET AND THE VIRTUAL ASSET MONITORING SYSTEM OPERATION 517 is not subject to manipulation, and/or termination, by a malicious party that may have taken control of the self-monitoring virtual asset.

In addition, the self-reporting communications channel generated by the virtual asset self-reporting communications channel creation logic at USE THE SELF-REPORTING COMMUNICATIONS CHANNEL CREATION LOGIC TO GENERATE A SELF-REPORTING COMMUNICATIONS CHANNEL BETWEEN THE SELF-MONITORING VIRTUAL ASSET AND THE VIRTUAL ASSET MONITORING SYSTEM OPERATION 517 is not dependent on security policy implementation systems and entities outside of the self-monitoring virtual asset, other than the virtual asset monitoring system.

In one embodiment, once the virtual asset self-reporting communications channel creation logic provided to the self-monitoring virtual asset, is used to generate a self-reporting communications channel between the self-monitoring virtual asset and the virtual asset monitoring system at USE THE SELF-REPORTING COMMUNICATIONS CHANNEL CREATION LOGIC TO GENERATE A SELF-REPORTING COMMUNICATIONS CHANNEL BETWEEN THE SELF-MONITORING VIRTUAL ASSET AND THE VIRTUAL ASSET MONITORING SYSTEM OPERATION 517, process flow proceeds to USE THE SELF-REPORTING COMMUNICATIONS CHANNEL TO TRANSFER THE TRIGGER EVENT REPORTING DATA FROM THE SELF-MONITORING VIRTUAL ASSET TO THE VIRTUAL ASSET MONITORING SYSTEM OPERATION 519.

In one embodiment, at USE THE SELF-REPORTING COMMUNICATIONS CHANNEL TO TRANSFER THE TRIGGER EVENT REPORTING DATA FROM THE SELF-MONITORING VIRTUAL ASSET TO THE VIRTUAL ASSET MONITORING SYSTEM OPERATION 519, the detected trigger event data generated by the virtual asset self-reporting logic at USE THE VIRTUAL ASSET SELF-REPORTING LOGIC TO GENERATE TRIGGER EVENT REPORTING DATA INDICATING THE DETECTED TRIGGER EVENT HAS BEEN DETECTED OPERATION 515 is transferred from the self-monitoring virtual asset to the virtual asset monitoring system of PROVIDE A VIRTUAL ASSET MONITORING SYSTEM OPERATION 503 using the virtual asset self-reporting communications channel generated by the virtual asset self-reporting communications channel creation logic at USE THE SELF-REPORTING COMMUNICATIONS CHANNEL CREATION LOGIC TO GENERATE A SELF-REPORTING COMMUNICATIONS CHANNEL BETWEEN THE SELF-MONITORING VIRTUAL ASSET AND THE VIRTUAL ASSET MONITORING SYSTEM OPERATION 517.

In one embodiment, once the detected trigger event data generated by the virtual asset self-reporting logic at USE THE VIRTUAL ASSET SELF-REPORTING LOGIC TO GENERATE TRIGGER EVENT REPORTING DATA INDICATING THE DETECTED TRIGGER EVENT HAS BEEN DETECTED OPERATION 515 is transferred from the self-monitoring virtual asset to the virtual asset monitoring system of PROVIDE A VIRTUAL ASSET MONITORING SYSTEM OPERATION 503 using the virtual asset self-reporting communications channel generated by the virtual asset self-reporting communications channel creation logic at USE THE SELF-REPORTING COMMUNICATIONS CHANNEL TO TRANSFER THE TRIGGER EVENT REPORTING DATA FROM THE SELF-MONITORING VIRTUAL ASSET TO THE VIRTUAL ASSET MONITORING SYSTEM OPERATION 519, process flow proceeds to GENERATE RESPONSIVE ACTION IMPLEMENTATION DATA IMPLEMENTING ONE OR MORE RESPONSIVE ACTIONS TO THE DETECTED TRIGGER EVENT OPERATION 521.

In one embodiment, at GENERATE RESPONSIVE ACTION IMPLEMENTATION DATA IMPLEMENTING ONE OR MORE RESPONSIVE ACTIONS TO THE DETECTED TRIGGER EVENT OPERATION 521, analysis is performed at the virtual asset monitoring system and the appropriate, or mapped, responsive action implementation data associated with the received trigger event data is identified.

In one embodiment, the analysis performed at GENERATE RESPONSIVE ACTION IMPLEMENTATION DATA IMPLEMENTING ONE OR MORE RESPONSIVE ACTIONS TO THE DETECTED TRIGGER EVENT OPERATION 521 includes mapping the detected trigger event data received to associated responsive action implementation data representing instructions for implementing one or more responsive actions to the trigger event indicated in the trigger event reporting data.

In various embodiments, the one or more responsive actions to the trigger event indicated in the trigger event reporting data represented in the associated responsive action implementation data includes data and instructions for, but not limited to, any of the following operations: ignoring the detected trigger event; requesting that the detected trigger event data no longer be reported; performing one or more scans on all, or part, of the logic and data contained and/or processed by the self-monitoring virtual assets, in one embodiment to attempt to identify malicious code or activity; obtaining data from the self-monitoring virtual assets; destroying data within the self-monitoring virtual assets; directing a transfer of data from within the self-monitoring virtual assets to a location outside the self-monitoring virtual assets, e.g., pulling data from the self-monitoring virtual assets prior to destroying the self-monitoring virtual assets; closing down one or more communications channels used by the self-monitoring virtual assets; shutting down, or off, one or more capabilities of the self-monitoring virtual assets; aborting one or more operations being performed by the self-monitoring virtual assets; destroying the self-monitoring virtual assets; and/or generating and/or transferring incorrect and/or deceptive data from the self-monitoring virtual assets to a location outside the self-monitoring virtual asset, such as a location or source associated with a malicious party; and/or any other desired responsive actions, or combination of responsive actions, as discussed herein, and/or as known in the art at the time of filing, and/or as developed/become available after the time of filing.

In one embodiment, once analysis is performed at the virtual asset monitoring system and the appropriate, or mapped, responsive action implementation data associated with the received trigger event data is identified at GENERATE RESPONSIVE ACTION IMPLEMENTATION DATA IMPLEMENTING ONE OR MORE RESPONSIVE ACTIONS TO THE DETECTED TRIGGER EVENT OPERATION 521, process flow proceeds to TRANSFER THE RESPONSIVE ACTION IMPLEMENTATION DATA FROM THE VIRTUAL ASSET MONITORING SYSTEM TO THE SELF-MONITORING VIRTUAL ASSET OPERATION 523.

In one embodiment, at TRANSFER THE RESPONSIVE ACTION IMPLEMENTATION DATA FROM THE VIRTUAL ASSET MONITORING SYSTEM TO THE SELF-MONITORING VIRTUAL ASSET OPERATION 523, the appropriate, or mapped, responsive action implementation data associated with the received trigger event data of GENERATE RESPONSIVE ACTION IMPLEMENTATION DATA IMPLEMENTING ONE OR MORE RESPONSIVE ACTIONS TO THE DETECTED TRIGGER EVENT OPERATION 521 is provided to the self-monitoring virtual asset.

In one embodiment, at TRANSFER THE RESPONSIVE ACTION IMPLEMENTATION DATA FROM THE VIRTUAL ASSET MONITORING SYSTEM TO THE SELF-MONITORING VIRTUAL ASSET OPERATION 523, the appropriate, or mapped, responsive action implementation data associated with the received trigger event data of GENERATE RESPONSIVE ACTION IMPLEMENTATION DATA IMPLEMENTING ONE OR MORE RESPONSIVE ACTIONS TO THE DETECTED TRIGGER EVENT OPERATION 521 is provided to the self-monitoring virtual asset using the virtual asset self-reporting communication channel, and the virtual asset self-reporting communications port, generated by the virtual asset self-reporting communications channel creation logic provided to the self-monitoring virtual asset.

In one embodiment, once the appropriate, or mapped, responsive action implementation data associated with the received trigger event data of GENERATE RESPONSIVE ACTION IMPLEMENTATION DATA IMPLEMENTING ONE OR MORE RESPONSIVE ACTIONS TO THE DETECTED TRIGGER EVENT OPERATION 521 is provided to the self-monitoring virtual asset at TRANSFER THE RESPONSIVE ACTION IMPLEMENTATION DATA FROM THE VIRTUAL ASSET MONITORING SYSTEM TO THE SELF-MONITORING VIRTUAL ASSET OPERATION 523, process flow proceeds to USE THE RESPONSIVE ACTION IMPLEMENTATION DATA TO IMPLEMENT THE ONE OR MORE RESPONSIVE ACTIONS TO THE TRIGGER EVENT INDICATED IN THE TRIGGER EVENT REPORTING DATA OPERATION 525.

In one embodiment, at USE THE RESPONSIVE ACTION IMPLEMENTATION DATA TO IMPLEMENT THE ONE OR MORE RESPONSIVE ACTIONS TO THE TRIGGER EVENT INDICATED IN THE TRIGGER EVENT REPORTING DATA OPERATION 525, the appropriate, or mapped, responsive action implementation data is used by the self-monitoring virtual asset to implement the responsive action associated with the responsive action implementation data.

As noted above, in various embodiments the responsive actions associated with the responsive action implementation data implemented at USE THE RESPONSIVE ACTION IMPLEMENTATION DATA TO IMPLEMENT THE ONE OR MORE RESPONSIVE ACTIONS TO THE TRIGGER EVENT INDICATED IN THE TRIGGER EVENT REPORTING DATA OPERATION 525 can include, but are not limited to, any one or more of, ignoring the detected trigger data; requesting the detected trigger data no longer be sent; performing a scan of selected data within the self-monitoring virtual asset; obtaining data from the self-monitoring virtual asset; directing a transfer of data from within the self-monitoring virtual asset to a location outside the self-monitoring virtual asset; closing down one or more communications channels used by the self-monitoring virtual asset; shutting down one or more capabilities of the self-monitoring virtual asset; aborting one or more operations performed by the self-monitoring virtual asset; destroying the self-monitoring virtual asset; generating and/or transferring incorrect and/or deceptive data from the self-monitoring virtual asset to a location outside the self-monitoring virtual asset associated with a malicious entity; and/or any other desired responsive actions, or combination of responsive actions, as discussed herein, and/or as known in the art at the time of filing, and/or as developed/become available after the time of filing.

In one embodiment, once the appropriate, or mapped, responsive action implementation data is used by the self-monitoring virtual asset to implement the responsive action associated with the responsive action implementation data at USE THE RESPONSIVE ACTION IMPLEMENTATION DATA TO IMPLEMENT THE ONE OR MORE RESPONSIVE ACTIONS TO THE TRIGGER EVENT INDICATED IN THE TRIGGER EVENT REPORTING DATA OPERATION 525, process flow proceeds to EXIT OPERATION 530.

In one embodiment, at EXIT OPERATION 530 process 500 for providing self-monitoring virtual assets is exited to await new data.

Using process 500 for providing self-monitoring virtual assets, self-monitoring virtual assets are provided that can independently and automatically detect one or more trigger events within the self-monitoring virtual asset, generate suspicious event reporting data from the self-monitoring virtual asset, provide the reporting data to a monitoring system external to the self-monitoring virtual asset, and automatically implement responsive actions and repairs to the self-monitoring virtual asset, all without relying detection of the suspicious event by entities outside the self-monitoring virtual asset itself, and/or any normal communications channels.

Therefore, using the self-monitoring virtual assets, and the methods and systems for providing self-monitoring virtual assets discussed herein, virtual assets, and the data processed and stored by virtual assets, are made more secure.

In one embodiment, the production environment 100 enables self-monitoring virtual assets to do one or more of report, troubleshoot and dismiss detected patterns that are inconsistent with historic operating patterns for the virtual assets, by providing an event library of patterns that correlate with external events, according to one embodiment.

Figure 6:
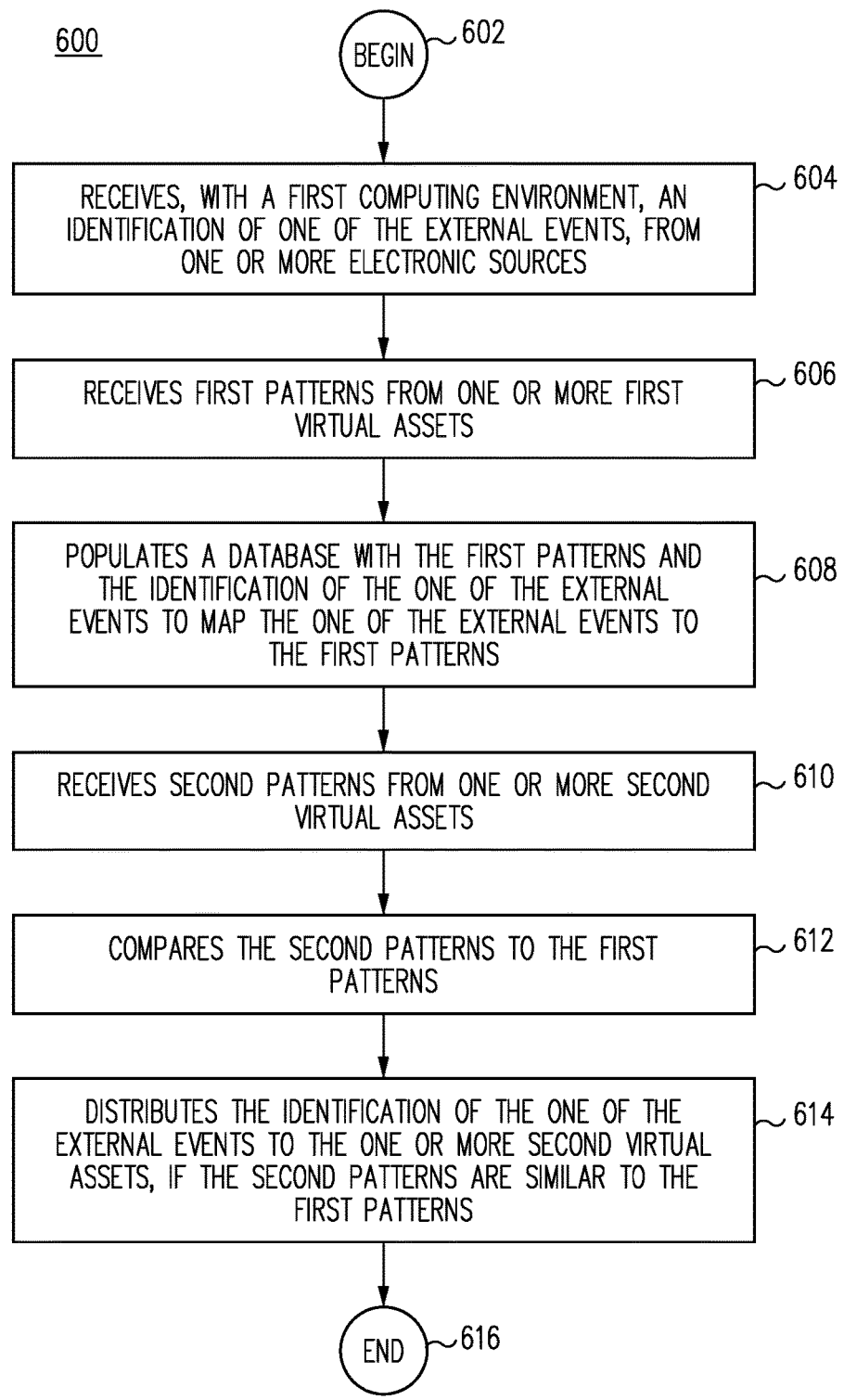
FIG. 6 is a flow chart depicting a process for enabling self-monitoring virtual assets to correlate external events with characteristic patterns associated with the virtual assets, in accordance with one embodiment.

FIG. 6 is a flow chart depicting a process 600 for enabling self-monitoring virtual assets to correlate external events with characteristic patterns associated with the virtual assets, in accordance with one embodiment.

At block 602, process 600 begins and process flow proceeds at block 604.

At block 604, process 600 receives, at a first computing environment, an identification of one or more external events currently occurring, from one or more electronic sources, according to one embodiment.

At block 604, production environment 1 (of FIG. 1) initializes and updates an external events library, such as a portion of one or more of virtual asset self-monitoring logic 132 and virtual asset self-monitoring logic 136, using patterns and events received from virtual assets during one or more external events, such as natural disasters, sporting events, wars, acts of terrorism, or the like, according to one embodiment.

The external events can be organized into two or more sub-categories, according to one embodiment. For example, according to various embodiments, a first sub-category of external events include random events, and the second sub-category of external events can include periodic/seasonal events. Examples of random events include, according to various embodiments, but are not limited to, war (e.g., Syrian Civil War), terrorism (e.g., intentionally downed passenger airplanes), and infrequently occurring natural disasters (e.g., volcanoes and earthquakes). Examples of periodic/seasonal events include, according to various embodiments, but are not limited to, sporting events (e.g., the World Cup), political events (e.g., presidential elections), and natural disasters (e.g., typhoons, hurricanes, tornadoes).

Natural disasters that can affect the computing resources physically located in a computing environment, e.g., a data center, include, but are not limited to, earthquakes, tornadoes, torrential rainfall, floods, and hurricanes. These external events can interfere with the operations of one or more virtual assets by disrupting or destroying power or communication pathways to a computing environment or to network resources used by the computing environment to communicate with other geographic locations. Even if a computing environment includes resources for providing emergency backup power, a tornado, earthquake, or hurricane can physically remove communication pathways between a virtual asset located in a first computing environment and a virtual asset located in a second computing environment. The destruction or isolation of an entire computing environment, due to a natural disaster, can be mapped to the virtual asset patterns in the event library 120, according to one embodiment. A mapping or correlation of virtual asset patterns to the destruction or isolation of an entire computing environment may be represented by denial of service from the isolated computing environment, failure to establish connections to the isolated computing environment, and/or an abrupt loss of incoming data or information from the isolated computing environment, according to various embodiments. By submitting a detected pattern to the event library 120, a virtual asset may receive confirmation that the reason for failed communications is the isolation of a remotely located computing environment, rather than the invasion of a security threat, according to one embodiment.

Miscellaneous events that are internal to a computing environment can include times when neighboring computing systems, virtual assets, or computing environments consume disproportionately large quantities of resources, e.g., network bandwidth. The disproportionately large consumption of resources can be due to extraordinary success of an application hosted by the neighboring computing system, or can be indicative of a DOS attack on the neighboring computing system, according to various embodiments. The event library 120 can be updated to include security threat breaches occurring in computing systems that share a computing environment, e.g., a data center, with a virtual asset, according to one embodiment. Thus, when the virtual asset detects a pattern such as a decrease in data center resources, the virtual asset can confirm that it has not been compromised to a security threat, but instead can confirm that the neighboring computing system has been compromised, according to one embodiment.

Contents of the event library may be distributed to one or more virtual assets of production environment 1, according to one embodiment through a push mechanism, a pull mechanism, or a push-pull mechanism. In one embodiment, updates to the event library are pushed to one or more virtual assets in response to the event library being updated with new external event information.

A source module, such as a subcomponent of one or more of virtual asset self-monitoring logic 132 and virtual asset self-monitoring logic 136 retrieves external event information for updating the events of the event library, according to one embodiment. Descriptions and notifications of events are retrieved from one or more web-based electronic sources, in one embodiment. For example, security threat information is retrieved from one or more computing security databases or repositories hosted by one or more computing security companies or agencies, according to one embodiment. As another example, natural disaster information is retrieved from rich site summaries ("RSS feeds") provided by web-interfaces with websites for the national oceanic and atmospheric administration ("NOAA"), other government organizations, or other trusted sources of natural disaster information, according to various embodiments. In yet another example, sporting event, political event, and other world event information and the periodicity of the events is retrieved from one or more other media-based or government-hosted websites, according to various embodiments.

In one embodiment, addresses, e.g., uniform resource locators, addresses of the event sources are stored in the event library, according to one embodiment. The event library also stores time-related information for the external events, according to one embodiment. By storing time-related information with the periodic external events, the event library is configured to automatically search for particular types of events during particular years or during particular times of particular years, according to various embodiments. For example, by storing time-related information for presidential elections, the event library can automatically search for trusted sources that provide information related to a presidential election. As another example, by storing time-related information for sporting events, the event library is enabled to automatically search for trusted sources to provide information related to the World Cup, the World Series, the Tour de France, the Super Bowl, or other popular sporting events, according to various embodiments.

Production environment 1 maintains and develops the events library by continuously or periodically adding additional events and patterns according to one embodiment. Production environment 1 can acquire patterns from virtual assets by pulling the patterns from the virtual assets when external events are detected, or by configuring the virtual assets to periodically push patterns to a virtual asset manager, according to one embodiment. Production environment 1 supports self-monitoring virtual assets by providing a library of external events that may match one or more current virtual asset patterns, e.g., anomalies, aberrations, and/or deviations in operational data for the virtual assets, according to one embodiment.

Virtual assets discussed herein can detect patterns, e.g., data patterns or operational patterns that are inconsistent with historical operations or historic operating patterns for a particular virtual asset. The virtual asset can be configured to compare the deviant patterns against one or more security threat libraries/databases to determine whether the deviant patterns are consistent with a known or characterized security threat. However, if the virtual asset detects deviant patterns that are both inconsistent with historical operating patterns and that do not match security threat database patterns, the virtual asset can fall short of operating autonomously of a system administrator, security personnel, or other human resources. Unexplained operating patterns can be indicative of service failures, hacker activity, or other grave issues, so unexplained operating patterns may, by default, result in automated requests for support by human resources. Providing an external events library enables the virtual assets to operate smarter, e.g., more autonomous of human resources, and properly react to deviations in historic operating patterns, according to one embodiment.

At block 606, the process receives first patterns from one or more first virtual assets, according to one embodiment. Each of the one or more first virtual assets provides one or more computing services to one or more users, and each of the one or more first virtual assets includes an allocation of one or more hardware and software resources from a second computing environment, according to one embodiment. The first patterns represent first operational characteristics of the one or more first virtual assets, according to one embodiment.

Examples of virtual asset patterns that are received or otherwise collected include any event, trigger, and/or deviation from a desired, nominal, or pre-determined operation of a virtual asset, according to one embodiment. In various embodiments, the patterns can include combinations of one or more of: available network bandwidth, denial of request to instantiate or terminate other virtual assets, processor usage percentage, memory usage percentage, number of queries, types of queries, quantity of traffic with respect to a mean or average, number of users, failure to communicate with other asset containers, receipt of a network message from a location known to be associated with malicious entities, frequency of outgoing network messages, communications with destinations that are not associated with a customer location of record, frequency of login attempts, frequency of failed login attempts, a size of parameters sent to the virtual asset, a size of outgoing network messages, a total quantity of data in any one communication, failure to perform important or critical operations, and other virtual asset operations discussed herein, and/or as known in the art at the time of filing, and/or as developed/made available after the time of filing.

At block 608, process 600 populates a database, e.g. the event library discussed herein, with the first virtual asset patterns and the identification of the one of the external events to map the one of the external events to the first virtual asset patterns, according to one embodiment.

The event library, such as a portion of virtual asset self-monitoring logic 132 and virtual asset self-monitoring logic 136, when populated with first virtual asset patterns and the identification of the one of the external events, provides virtual assets with a correlation between virtual asset patterns and external events, according to one embodiment. The event library can support virtual assets in recognizing seasonal, periodic, and random external events by storing patterns that were generated by virtual assets during one or more external events, according to one embodiment. The event library is updated with external events and their corresponding virtual asset patterns continuously, periodically, or as external events occur, according to one embodiment.

Examples of virtual asset patterns that are collected, analyzed, and mapped to external events include any event, trigger, and/or deviation from a desired, nominal, or predetermined operation of a virtual asset, according to one embodiment. In various embodiments, the patterns can include combinations of one or more of available network bandwidth, denial of request to instantiate or terminate other virtual assets, processor usage percentage, memory usage percentage, number of queries, types of queries, quantity of traffic with respect to a mean or average, number of users, failure to communicate with other asset containers, receipt of a network message from a location known to be associated with malicious entities, frequency of outgoing network messages, communications with destinations that are not associated with a customer location of record, frequency of login attempts, frequency of failed login attempts, a size of parameters sent to the virtual asset, a size of outgoing network messages, a total quantity of data in any one communication, failure to perform important or critical operations, and other virtual asset operations discussed herein, and/or as known in the art at the time of filing, and/or as developed/made available after the time of filing.

At block 610, the process receives second patterns from one or more second virtual assets, according to one embodiment. The second patterns represent second operational characteristics of the one or more second virtual assets, according to one embodiment.

As noted herein, the second virtual assets are, in one embodiment, enabled to monitor their own characteristics which form patterns representative of a current condition of the second virtual assets. As such, process 600 is enabled to receive one or more of those characteristics as a pattern to be used in a later determination of whether the received pattern matches or closely matches one or more patterns previously established at block 606 and populating a database such as at block 608.

In various embodiments, the patterns can include one or more of available network bandwidth, denial of request to instantiate or terminate other virtual assets, processor usage percentage, memory usage percentage, number of queries, types of queries, quantity of traffic with respect to a mean or average, number of users, failure to communicate with other asset containers, receipt of a network message from a location known to be associated with malicious entities, frequency of outgoing network messages, communications with destinations that are not associated with a customer location of record, frequency of login attempts, frequency of failed login attempts, a size of parameters sent to the virtual asset, a size of outgoing network messages, a total quantity of data in any one communication, failure to perform important or critical operations, and other virtual asset operations discussed herein, and/or as known in the art at the time of filing, and/or as developed/made available after the time of filing.

At 612, the process compares the second patterns to the first patterns, according to one embodiment. In one embodiment, the comparison is made to determine one or more events of the event library that have a pattern that is similar to or matches the pattern exhibited by a second virtual asset.

As an example, natural disasters that can affect the computing resources physically located in a computing environment, e.g., a data center, include, but are not limited to, earthquakes, tornadoes, torrential rainfall, floods, and hurricanes. These external events can interfere with the operations of one or more virtual assets by disrupting or destroying power or communication pathways to a computing environment or to network resources used by the computing environment to communicate with other geographic locations. Even if a computing environment includes resources for providing emergency backup power, a tornado, earthquake, or hurricane can physically remove communication pathways between a virtual asset located in a first computing environment and a virtual asset located in a second computing environment. The destruction or isolation of an entire computing environment, due to a natural disaster, can be mapped to the virtual asset patterns in the event library, according to one embodiment. A mapping or correlation of virtual asset patterns to the destruction or isolation of an entire computing environment may be represented by denial of service from the isolated computing environment, failure to establish connections to the isolated computing environment, and/or an abrupt loss of incoming data or information from the isolated computing environment, according to various embodiments. By submitting a detected pattern to the event library, a virtual asset may receive confirmation that the reason for failed communications is the isolation of a remotely located computing environment, rather than the invasion of a security threat, according to one embodiment.

Miscellaneous events that are internal to a computing environment can include times when neighboring computing systems, virtual assets, or computing environments consume disproportionately large quantities of resources, e.g., network bandwidth. The disproportionately large consumption of resources can be due to extraordinary success of an application hosted by the neighboring computing system, or can be indicative of a DOS attack on the neighboring computing system, according to various embodiments. The event library can be updated to include security threat breaches occurring in computing systems that share a computing environment, e.g., a data center, with a virtual asset, according to one embodiment. Thus, when the virtual asset detects a pattern such as a decrease in data center resources, the virtual asset can confirm that it has not been compromised to a security threat, but instead can confirm that the neighboring computing system has been compromised, according to one embodiment.

The event library enables virtual assets of virtual asset and production environment 1 to proactively redistribute services to unaffected resources, according to one embodiment. For example, if a virtual asset detects a pattern that the event library correlates to a political event, sporting event, or other external event that will reduce a quality of services the virtual asset can provide, the virtual asset can be configured to instantiate a new virtual asset or be configured to transfer service hosting to a different virtual asset, which may not be affected by the external event, according to one embodiment. As another example, if a first virtual asset uses a second virtual asset to provide duplicative or backup services, and the first virtual asset detects a pattern that the event library correlates to a destruction or isolation of the second virtual asset, the first virtual asset can be configured to instantiate one or more new virtual assets in another asset container, e.g., a third or fourth asset container, so that the virtual asset ensures duplicative services are provided, according to one embodiment.

At 614, the process distributes the identification of the one of the external events to the one or more second virtual assets, if the second patterns are similar to the first patterns, according to one embodiment.

In an alternate embodiment, following a determination that a comparison between a pattern of a virtual asset matches or is similar to a pattern of the event library, process flow proceeds with GENERATE RESPONSIVE ACTION IMPLEMENTATION DATA IMPLEMENTING ONE OR MORE RESPONSIVE ACTIONS TO THE DETECTED TRIGGER EVENT OPERATION 521 as previously described.

At block 616, the process ends.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for enabling self-monitoring virtual assets to correlate external events with characteristic patterns associated with the virtual assets, comprising:

receiving, at a first computing environment from one or more electronic sources external to the first computing environment, data identifying one or more external events currently occurring wherein the external events include at least one of a natural disaster, and a world event;

receiving first patterns from one or more first virtual assets providing one or more computing services to one or more users, each of the one or more first virtual assets including an allocation of one or more hardware and software resources from a second computing environment, the first patterns representing operational characteristics of the first virtual assets and generated by the one or more first virtual assets during the occurrence of a respective external event of the one or more external events;

learning, by populating a database with the first patterns and the data identifying the respective external events, a correlation between external events to first patterns representing a deviation from a normal operating parameter as a result of an occurrence of the respective external events at the time of the deviation;

providing a virtual asset monitoring system;

defining one or more trigger events to be reported when detected in a virtual asset, at least one defined trigger event being a detection, in a virtual asset, of a pattern in the virtual asset matching a first pattern of the database representing a deviation from a normal operating parameter as a result of an occurrence of an external event;

generating virtual asset self-monitoring logic representing instructions for detecting the one or more trigger events within a virtual asset;

generating virtual asset self-reporting logic representing instructions for generating trigger event reporting data indicating a detected trigger event if one of the one or more trigger events is detected in a virtual asset;

generating virtual asset self-reporting communications channel creation logic representing instructions for opening a self-reporting communications channel between a virtual asset and the virtual asset monitoring system upon detection of one or more trigger events in a virtual asset;

instantiating a second virtual asset, the second virtual asset including, at instantiation, the virtual asset self-monitoring logic, the virtual asset self-reporting logic, and the virtual asset self-reporting communications channel creation logic;

detecting, in the second virtual asset, a trigger event of the one or more trigger events, the detected trigger event being a detection, in the second virtual asset, of a pattern in the second virtual asset matching a first asset pattern representing a deviation from a normal operating parameter as a result of an occurrence of an external event, the pattern in the second virtual asset representing second operational characteristics of the second virtual asset that represent deviations by the second virtual asset from predetermined live operational characteristics determined from an exemplary operational virtual asset;

generating, by the second virtual asset, trigger event reporting data indicating the detected trigger event has been detected;

generating, by the second virtual asset, a self-reporting communications channel between the second virtual asset and the virtual asset monitoring system; and transferring, by the second virtual asset over the self-reporting communications channel, the trigger event reporting data.

2. The method of claim 1, wherein the natural disaster includes one or more of a hurricane, a tornado, an earthquake, a tsunami, a typhoon, a volcano, and a flood.

3. The method of claim 1, wherein the world event includes one or more of a sporting event, an election, an act of terrorism, and a war.

4. The method of claim 1, the external events further including a malicious software attack and
wherein the malicious software attack includes one or more of a denial of service attack, a virus, a worm, a Trojan horse, spoofing, and pharming.

5. The method of claim 1, wherein the first and second operational characteristics include one or more characteristics selected from a group of characteristics including one or more types of messages received, quantities of messages received, geographic origins of messages received, frequencies of messages received, size of messages received, failed user account login attempts, processor usage percentages, denied access to a third computing environment, memory usage percentages, and network bandwidth.

6. The method of claim 1, wherein each of the one or more second virtual assets provides the one or more computing services to the one or more users,
wherein each of the one or more second virtual assets includes an second allocation of one or more second hardware and software resources from a third computing environment.

7. The method of claim 1 wherein the second virtual asset is a virtual asset selected from the group of the virtual assets consisting of:

a virtual machine;
a virtual server;
a database or data store;
an instance in a cloud environment;
a cloud environment access system;
part of a mobile device;
part of a remote sensor;
part of a server computing system; and
part of a desktop computing system.

8. The method of claim 1 wherein at least one of the one or more external events is selected from the group of external events consisting of:
a response to a customer request being directed to a destination that is not the customer location of record;
a virtual asset receiving a high-frequency of login attempts that fail;
a total amount of data in any one communication connection of a virtual asset exceeding a defined maximum;
a request to a virtual asset coming in from a location known to be associated with malicious entities; and
an internal elapsed time of defined critical operations changing to a time outside a defined range.

9. The method of claim 1, wherein the one or more electronic sources include websites or web-interfaces to one or more government agencies, media companies, and computing security companies.

10. The method of claim 1, further comprising:
determining if each of the one or more electronic sources satisfies a minimum threshold of trust, wherein receiving the identification of one of the external events includes receiving the identification, from the one or more electronic sources that satisfy the minimum threshold of trust.

11. The method of claim 1, further comprising:
increasing a number of the one or more electronic sources to enable improved verification of occurrences of the external events.

12. A system for correlating virtual asset patterns with external events, the system comprising:
at least one computing processor; and
at least one memory coupled to the at least one processor, the at least one memory having stored therein instructions which, when executed by any set of the at least one computing processors, perform a process for correlating virtual asset patterns with external events, the process including:
receiving, at a first computing environment from one or more electronic sources external to the first computing environment, data identifying one or more external events currently occurring wherein the external events include at least one of a natural disaster, and a world event;
receiving first patterns from one or more first virtual assets providing one or more computing services to one or more users, each of the one or more first virtual assets including an allocation of one or more hardware and software resources from a second computing environment, the first patterns representing operational characteristics of the first virtual assets and generated by the one or more first virtual assets during the occurrence of a respective external event of the one or more external events;
learning, by populating a database with the first patterns and the data identifying the respective external events, a correlation between external events to first patterns representing a deviation from a normal operating parameter as a result of an occurrence of the respective external events at the time of the deviation;
providing a virtual asset monitoring system;
defining one or more trigger events to be reported when detected in a virtual asset, at least one defined trigger event being a detection, in a virtual asset, of a pattern in the virtual asset matching a first pattern of the database representing a deviation from a normal operating parameter as a result of an occurrence of an external event;
generating virtual asset self-monitoring logic representing instructions for detecting the one or more trigger events within a virtual asset;
generating virtual asset self-reporting logic representing instructions for generating trigger event reporting data indicating a detected trigger event if one of the one or more trigger events is detected in a virtual asset;
generating virtual asset self-reporting communications channel creation logic representing instructions for opening a self-reporting communications channel between a virtual asset and the virtual asset monitoring system upon detection of one or more trigger events in a virtual asset;
instantiating a second virtual asset, the second virtual asset including, at instantiation, the virtual asset self-monitoring logic, the virtual asset self-reporting logic, and the virtual asset self-reporting communications channel creation logic;
detecting, in the second virtual asset, a trigger event of the one or more trigger events, the detected trigger event being a detection, in the second virtual asset, of a pattern in the second virtual asset matching a first asset pattern representing a deviation from a normal operating parameter as a result of an occurrence of an external event, the pattern in the second virtual asset representing second operational characteristics of the second virtual asset that represent deviations by the second virtual asset from predetermined live operational characteristics determined from an exemplary operational virtual asset;
generating, by the second virtual asset, trigger event reporting data indicating the detected trigger event has been detected;
generating, by the second virtual asset, a self-reporting communications channel between the second virtual asset and the virtual asset monitoring system; and
transferring, by the second virtual asset over the self-reporting communications channel, the trigger event reporting data.

13. The system of claim 12, wherein the natural disaster includes one or more of a hurricane, a tornado, an earthquake, a tsunami, a typhoon, a volcano, and a flood.

14. The system of claim 12, wherein the world event includes one or more of a sporting event, an election, an act of terrorism, and a war.

15. The system of claim 12, the external events further including a malicious software attack, and
wherein the malicious software attack includes one or more of a denial of service attack, a virus, a worm, a Trojans horse, spoofing, and pharming.

16. The system of claim 12, wherein the first and second operational characteristics include one or more characteristics selected from a group of characteristics including one or more types of messages received, quantities of messages received, geographic origins of messages received, frequencies of messages received, size of messages received, failed user account login attempts, processor usage percentages, denied access to a third computing environment, memory usage percentages, and network bandwidth.

17. The system of claim 12, wherein each of the one or more second virtual assets provides the one or more computing services to the one or more users,
   wherein each of the one or more second virtual assets includes an second allocation of one or more second hardware and software resources from a third computing environment.

18. The system of claim 12, wherein the one or more electronic sources include websites or web-interfaces to one or more government agencies, media companies, and computing security companies.

* * * * *